(12) United States Patent
Okawa

(10) Patent No.: US 7,664,743 B2
(45) Date of Patent: Feb. 16, 2010

(54) DATA PROCESSING UNIT

(75) Inventor: Taisuke Okawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 459 days.

(21) Appl. No.: 11/788,482

(22) Filed: Apr. 20, 2007

(65) Prior Publication Data

US 2007/0250490 A1    Oct. 25, 2007

(30) Foreign Application Priority Data

| Apr. 20, 2006 | (JP) | ............................ 2006-117099 |
| Apr. 20, 2006 | (JP) | ............................ 2006-117106 |
| Mar. 5, 2007 | (JP) | ............................ 2007-053999 |

(51) Int. Cl.
*G06F 17/30* (2006.01)

(52) U.S. Cl. .................... 707/3; 707/5; 707/9; 715/748; 715/762; 715/834

(58) Field of Classification Search ...................... 707/3
See application file for complete search history.

(56) References Cited

U.S. PATENT DOCUMENTS

| 7,274,375 | B1 * | 9/2007 | David ........................... 345/619 |
| 7,325,198 | B2 * | 1/2008 | Adcock et al. .............. 715/722 |
| 7,418,671 | B2 * | 8/2008 | Hama et al. .................. 715/830 |
| 7,433,271 | B2 * | 10/2008 | Kuepfer et al. ................. 368/28 |
| 7,499,994 | B2 * | 3/2009 | Sapiro et al. ................. 709/224 |
| 2006/0010395 | A1 * | 1/2006 | Aaltonen ...................... 715/779 |
| 2007/0005580 | A1 * | 1/2007 | Rinearson et al. ............... 707/3 |
| 2008/0222541 | A1 * | 9/2008 | Machtelinck ............... 715/764 |

FOREIGN PATENT DOCUMENTS

| JP | 2000-041209 | 2/2000 |
| JP | 2000-132555 | 5/2000 |

\* cited by examiner

*Primary Examiner*—Don Wong
*Assistant Examiner*—Binh V Ho
(74) *Attorney, Agent, or Firm*—Nutter McClennen & Fish LLP; John J. Penny, Jr.

(57) ABSTRACT

A data processing unit includes: a data storage section; a data acquisition section that acquires the dates of multiple date items including date attributes; a date representing section that represents the dates of data in such a manner that the lapse of months from January to December is expressed circumferentially and the lapse of two or more years is expressed radially; a search-range representing section superposed on the date representing section and representing a sectored search range concentric with the date representing section so that the user can designate a search range, wherein the central angle of the sectored search range represents the range of date of search data and the radial thickness of the sectored search range represents the range of year of the search data; and a search section that searches for data having the date in the range designated in the search-range representing section from the date stored in the data storage section.

15 Claims, 19 Drawing Sheets

FIG. 4

| IMAGE FILE NAME | FOLDER NAME | DATE IMAGE TAKEN | DAY OF WEEK | HOLIDAY | THUMBNAIL |
|---|---|---|---|---|---|
| A0001.JPG | XYZ001 | 2/10/2006 | FRIDAY | | A0001THUM.JPG |
| A0002.JPG | XYZ001 | 2/10/2006 | FRIDAY | | A0002THUM.JPG |
| A0003.JPG | XYZ001 | 2/11/2006 | SATURDAY | HOLIDAY | A0003THUM.JPG |
| ... | ... | ... | ... | ... | ... |

DB10

DATA PROCESSING UNIT

The entire disclosure of Japanese Patent Application Nos: 2006-117099, filed Apr. 20, 2006 and 2006-117106, filed Apr. 20, 2006 and 2007-053999, filed Mar. 5, 2007 is expressly incorporated by reference herein.

BACKGROUND

1. Technical Field

The present invention relates to data processing units, and particularly, to a data processing unit that allows users to search for desired data from high volumes of data.

2. Related Art

Image processing units of personal computers or the like have become capable of storing high volumes of image data with increasing capacity of hard disk drives. However, when high volumes of image data is stored in a hard disk drive, it is difficult for the user to find out desired data from the hard disk drive. Particularly if a desired image is taken two or three years ago, the user does not often remember the year the image is taken.

Therefore, a method of displaying pictures on a calendar has been proposed as a method for search. In this case, the user finds out a picture taken on a specific date from the pictures displayed on the calendar. However, it is actually difficult for the user to remember the date. Moreover, the calendar representation makes it difficult to find the picture from several years, and thus complicating the operation therefor.

Particularly, photography enthusiasts sometimes take pictures at similar time and location (seasonal pictures such as those of cherry and snow), and thus desire to compare or search for them across several years. However, such searching across several years needs complicated operations including designation of search criteria one by one.

To improve the convenience for image search, JP-A-2000-41209 discloses a method of filing image data in advance and hierarchically organizing them. However, this method requires the user to group image data in advance. Moreover, the searching efficiency depends a lot on whether the grouping is adequate or not.

For search for character information, as disclosed in 2000-132555, the user can designate the accuracy of keyword searching to the accuracy of search criteria input by the user by designating the degree of ambiguity. In contrast, for image search, it is extremely difficult for the user to designate search accuracy to the accuracy of the search criteria input by the user.

Furthermore, in image search, it is necessary to notify the user of the distribution of images to the date the images taken in one way or another. However, when the number of images increases or when the range of the date images taken expands, it becomes difficult to display the distribution of the numbers of images for intuitive graphic user interface.

Such problems are not confined to image data but also for various kinds of data.

SUMMARY

An advantage of some aspects of the invention is to provide a data processing unit that allows users to search for desired data from high volumes of data.

According to a first aspect of the invention, there is provided a data processing unit including: a data storage section; a data acquisition section that acquires the dates of multiple date items including date attributes; a date representing section that represents the dates of data in such a manner that the lapse of months from January to December is expressed circumferentially and the lapse of two or more years is expressed radially; a search-range representing section superposed on the date representing section and representing a sectored search range concentric with the date representing section so that the user can designate a search range, wherein the central angle of the sectored search range represents the range of date of search data and the radial thickness of the sectored search range represents the range of year of the search data; and a search section that searches for data having the date in the range designated in the search-range representing section from the date stored in the data storage section.

In this case, the data processing unit further includes a control section that controls the range of the year and/or date of search data. When the control section is controlled, the search-range representation of the search-range representing section and/or the date representation of the date representing section may also be controlled correspondingly.

In this case, the sectored search range represented by the search-range representing section may include: a first arc; a second arc smaller than the first arc; and two parallel straight lines connecting the first arc and the second arc. The sector may concentric with the date representing section, the central angle of the sector corresponding to the range of date of the search data. When the range of the year of search data is controlled by the control section, the first arc and/or the second arc of the search-range representing section may also be controlled so that the search range represented over the date representing section includes the year of the search data but does not include other years.

The data processing unit may further include a day-of-week selecting section that selects the day-of-week and/or holiday to which the search data belongs. When the day-of-week and/or holiday is designated at the day-of-week selecting section, the search section may search for data including the designated the day-of-week and/or holiday as an attribute.

The date representing section may include a search-center designating section for the user to designate the central date of search. When the user designates the central date of search with the search-center designating section, the search-range representing section may represent the search range in such a manner that the central date of the search divides the lapse of time of the search range representation into two parts.

The data processing unit may further include a data-distribution calculating section that calculates the distribution of the number of data per date on the basis of the date of data. The date representing section may represent dates on the basis of the distribution calculated by the data-distribution calculating section.

The data may be picture data; and the date may be the date on which the picture is taken.

The data processing unit may further include an image display section that displays images in the picture data found by the search section at random, with the transparency increased as the date separates from the date designated by the search-center designating section.

The data processing unit may further include an image display section that displays the images in the picture data found by the search section in order of increasing lapse of time from the date designated by the search-center designating section.

The data processing unit may further include an image display section that displays the images in the picture data found by the search section at random, with the size of the images decreased as the date separates from the date designated by the search-center designating section.

In such cases, the image display section may display the images in the picture data found by the search section, with the images thinned out, and in the form of a slide show.

The date representing section may have a plurality of concentric circumferential rings, each of which representing one year.

The date representing section may represent the lapse of time continuously and spirally, one round of the spiral representing the lapse of one year.

The data stored in the data storage section may be image data. The data acquisition section may acquire the date on which the image data stored in the data storage section is taken. the data processing unit may further include: an image-distribution calculating section that calculates the distribution of the number of images per date image taken on the basis the date acquired by the data acquisition section; and an image-distribution representing section that represents the distribution of the number of images calculated by the image-distribution calculating section in associated with the date represented by the date representing section, wherein changes in the number of images in the distribution of the number of images are represented by changes in hue or the light and shade of a specific color.

In this case, the search section may search for image data having the date in the range designated by the search-range representing section from the image data stored in the data storage section.

According to a second aspect of the invention, there is provided a method for data search of a data processing unit including a data storage section that stores multiple data items including date attributes and a display screen. The method includes: displaying a date representing section on the display screen, the date representing section representing the date of data in such a manner that the lapse of months from January to December is expressed circumferentially and the lapse of two or more years is expressed radially; representing a sectored search range superposed on the date representing section so that the user can designate a search range, the sectored search range being concentric with the date representing section on the display screen, wherein the central angle of the sectored search range represents the range of date of search data and the radial thickness of the sectored search range represents the range of year of the search data; and searching for data having the date in the range designated in the search-range representing section from the date stored in the data storage section.

According to a third aspect of the invention, there is provided a recording medium that stores a program for searching for data with a data processing unit including a data storage section that stores multiple date items including date attributes and a display screen. The program includes program code for: displaying a date representing section on the display screen, the date representing section representing the date of data in such a manner that the lapse of months from January to December is expressed circumferentially and the lapse of two or more years is expressed radially; representing a sectored search range superposed on the date representing section so that the user can designate a search range, the sectored search range being concentric with the date representing section on the display screen, wherein the central angle of the sectored search range represents the range of date of search data and the radial thickness of the sectored search range represents the range of year of the search data; and searching for data having the date in the range designated in the search-range representing section from the date stored in the data storage section.

BRIEF DESCRIPTION OF THE DRAWINGS

The invention will be described with reference to the accompanying drawings, wherein like numbers reference like elements.

FIG. 4 is a diagram of an example of the structure of an image database generated by the image processing unit of FIG. 1.

DESCRIPTION OF EXEMPLARY EMBODIMENTS

Embodiments of the present invention will be described with reference to the drawings. It should be understood that the following embodiments do not limit the technical scope of the invention.

First Embodiment

Figure 1:
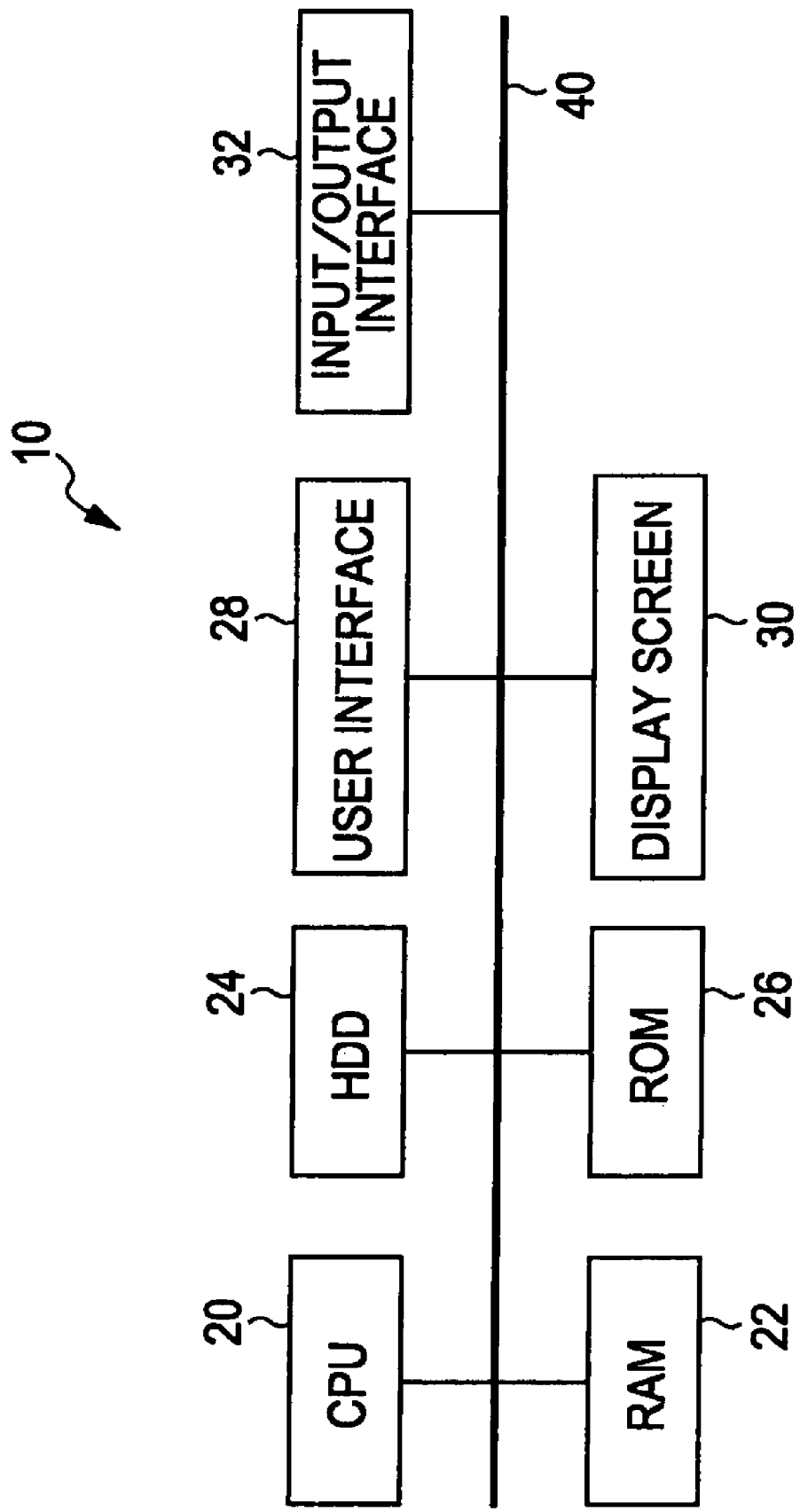
FIG. 1 is a block diagram of an example of the internal structure of an image processing unit according to a first embodiment.

FIG. 1 a block diagram of an example of the internal structure of an image processing unit according to a first embodiment. Examples of the image processing unit, denoted by reference numeral 10, include information processing units of notebook or desktop personal computers, mobile phones in which image data can be stored, printers having a display screen, and photo viewers.

As shown in FIG. 1, the image processing unit 10 according to the first embodiment includes, for example, a central processing unit (CPU) 20, a random access memory (RAM) 22, a hard disk drive 24, a read only memory (ROM) 26, a user interface 28, a display screen 30, and an input/output interface 32, which are mutually connected via an internal bus 40.

The hard disk drive 24 is an example of a high-storage image storage section in which high volumes of image data is stored. Here, the image data is assumed to be still-image data; it may include moving-image data.

The user interface 28 is a device for the user to input various information to the image processing unit 10, and includes various pointing devices such as a key board and a mouse. In this embodiment, the user interface 28 is used to input various instructions and selections on an image search screen, to be described later.

An example of the input/output interface 32 is a USB interface. In this embodiment, image data taken by an image-pickup device is taken into the image processing unit 10 via the user interface 28, and is stored in the hard disk drive 24.

An example of the display screen 30 is a liquid crystal display (LCD). In the example of FIG. 1, the display screen 30 is integrated to the image processing unit 10; alternatively, it may be separate from the image processing unit 10 main body.

Figure 2:
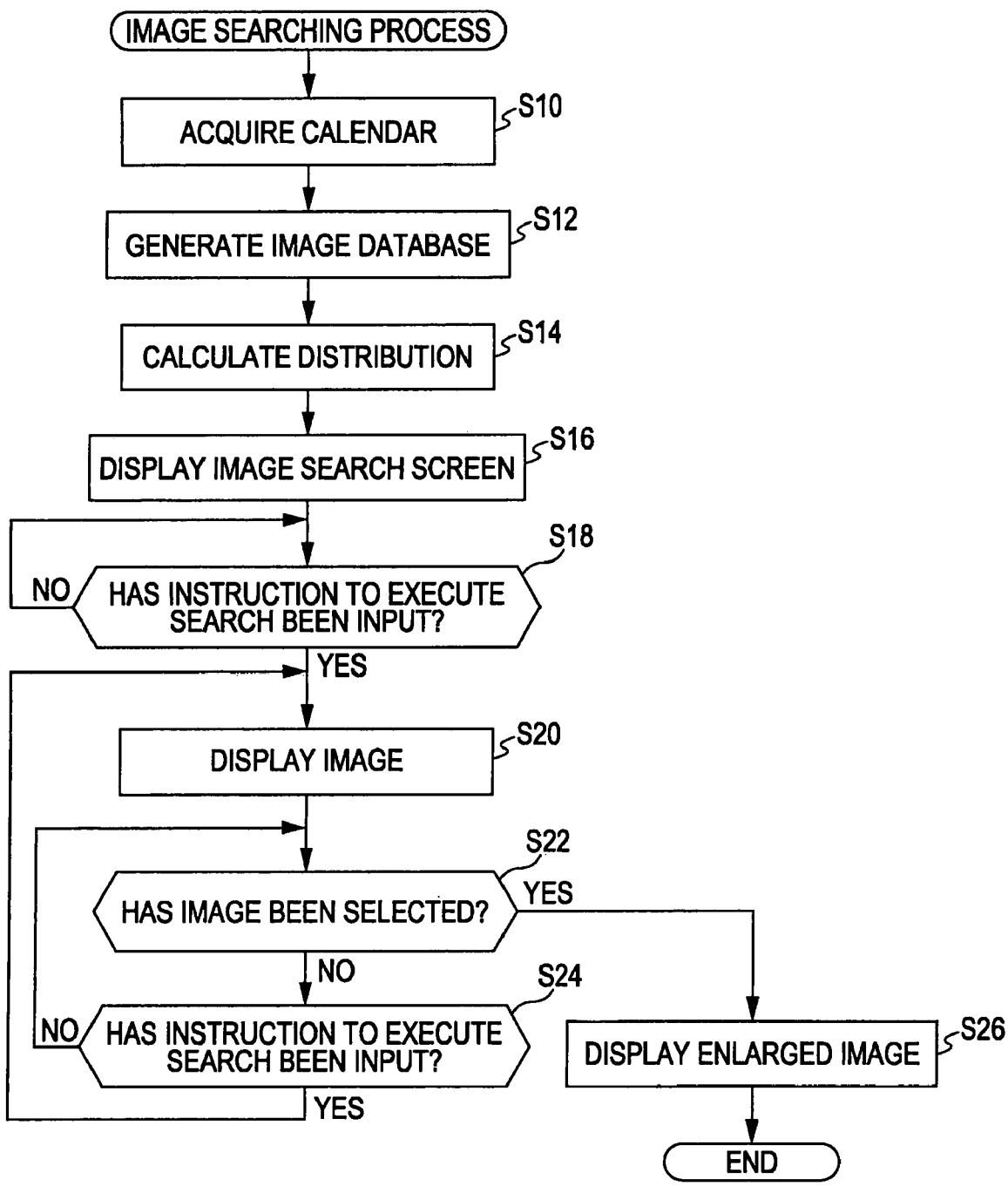
FIG. 2 is a flowchart for an example of the image search operation of the image processing unit of FIG. 1.
Figure 3:
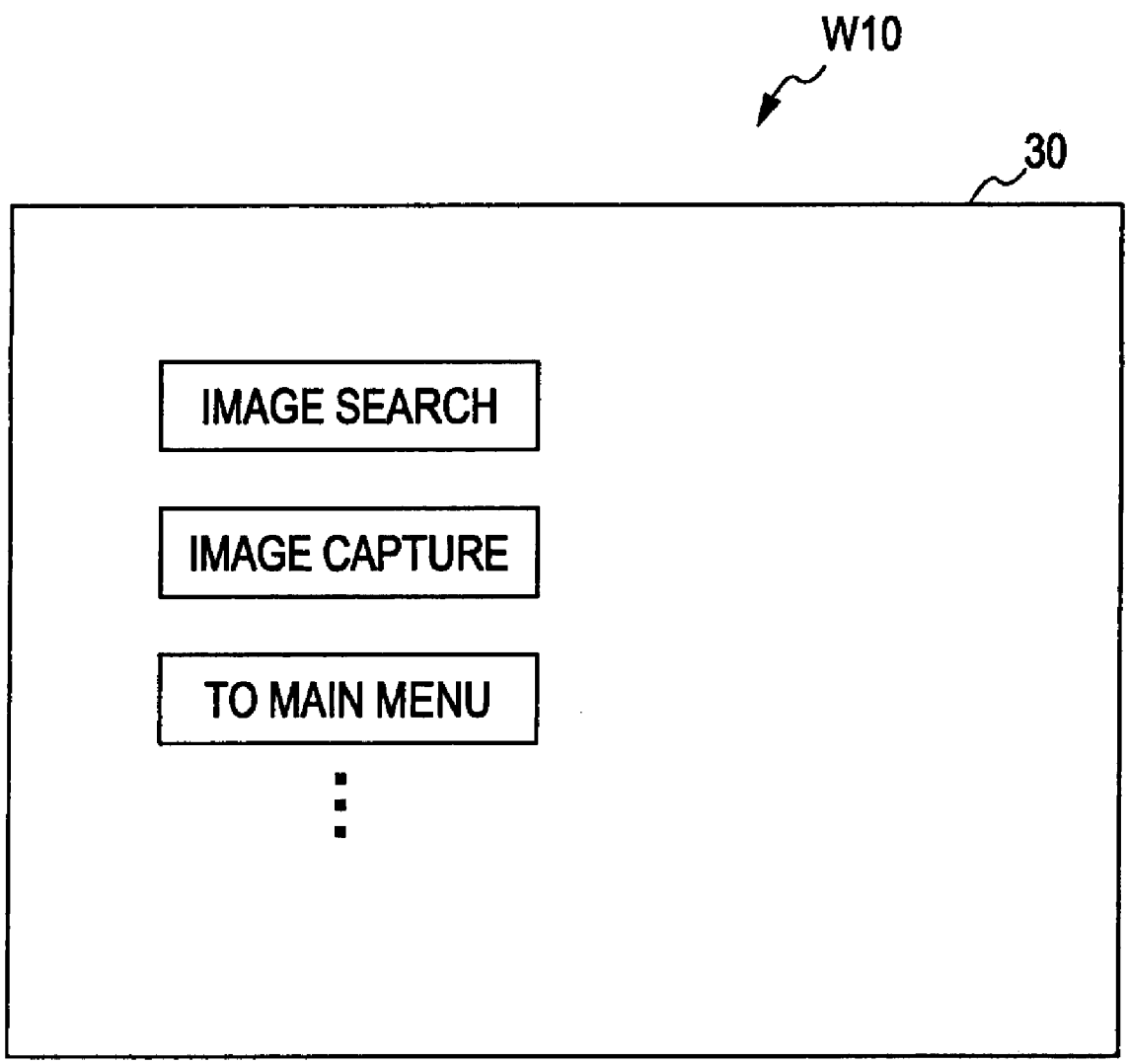
FIG. 3 is a diagram of an example of a menu screen displayed on the display screen of the image processing unit in FIG. 1.

FIG. 2 is a flowchart for an example of an image search operation of this embodiment. The image search operation shown in FIG. 2 is started when the user selects "Image Search" on a menu screen W10 in FIG. 3 displayed on the display screen 30. In this embodiment, this process is started when the user double-clicks on "Image Search" on the menu screen W10 with a mouse. The image search operation is achieved in such a manner that the CPU 20 reads and executes an image-search operation program stored in the hard disk drive 24 or the ROM 26.

As shown in FIG. 2, in the image search operation, the image processing unit 10 first acquires a calendar (step S10). Specifically, the image processing unit 10 acquires today's date on which the image search operation is executed and past calendars using the calendar function of the image processing unit 10.

Next, the image processing unit 10 generates an image database (step S12). FIG. 4 shows an example of the structure of an image database DB10 generated at that time. The image database DB10 shown in FIG. 4 is generated, for example, in the hard disk drive 24.

As shown in FIG. 4, the image database DB10 contains data items, "Image File Name", "Folder Name", "Date Image Taken", "Day of Week", "Holiday", and "Thumbnail". "Image File Name" stores the file names of image data stored in the hard disk drive 24. "Folder Name" stores the folder names in which the image data is stored. In which folder the image data is stored may be either predetermined or designated by the user.

"Date Image Taken" stores the date that the image is taken. The date is included in image data as information. The "Date Image Taken" may store also the time that the image is taken. "Day of Week" stores the day of week on which the image is taken. "Holiday" stores information indicative of whether the date the image is taken is a holiday. Information on the day of week and the holiday is specified by the date image taken and the calendar acquired in step S10. However, when the image data includes also the information on the day of week and holiday, there is necessarily no need to use the calendar.

"Thumbnail" stores a file name in which the thumbnail data of the image data is held. When the thumbnail image data is not present in the hard disk drive 24, the image processing unit 10 generates the thumbnail image data when generating the image database DB10. In this embodiment, the thumbnail image data is stored in the folder of the image database DB10.

However, the thumbnail image data may not be generated. When no thumbnail image data is generated, the image processing unit 10 generates it each time a thumbnail image needs to be displayed. In this case, thumbnail image data may be generated as necessary from the original image data.

Then, as shown in FIG. 2, the image processing unit 10 calculates the distribution of the dates the images taken (step S14). Specifically, the image processing unit 10 acquires the dates from the image database DB10, and counts the number of images for each date. In other words, the image processing unit 10 calculates the number of the images taken on that date. The image processing unit 10 corrects the count with a normal distribution.

Figure 5:
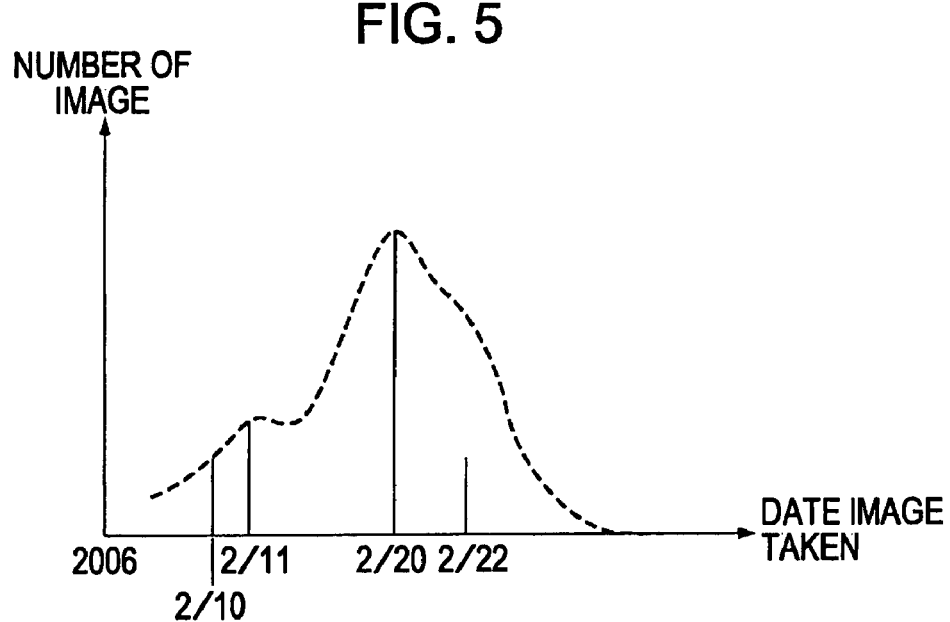
FIG. 5 is a graph for describing the process of correcting the relationship between the dates and number of images with a normal distribution to calculate the distribution of the dates on which the images are taken.

For example, assume that images taken on Feb. 10, Feb. 11, Feb. 20, and Feb. 22, 2006 are present, as shown in the bar chart of FIG. 5 (the number of images taken is plotted against the date the images taken). In this case, the number of the images is corrected with a normal distribution so that the peaks of the bars on the dates of image taking are smoothly connected. Specifically, also the numbers of the images before and after the date image taken are virtually added so that the number of the images taken on that date becomes the peak of the normal distribution. The result of the correction is indicated by the dotted line. The result of the correction is the distribution of the dates the image taken.

Figure 6:
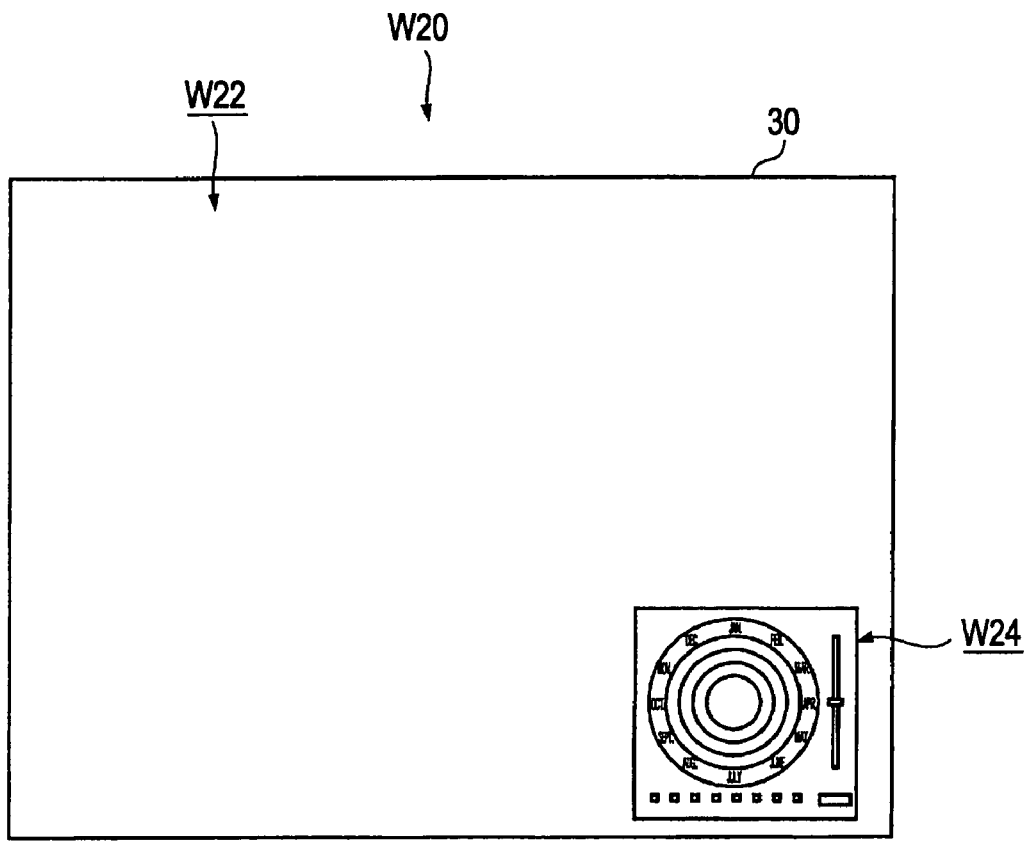
FIG. 6 is a diagram of an example of an image search screen displayed on the display screen of the image processing unit of FIG. 1.

As shown in FIG. 2, the image processing unit 10 then displays an image search screen on the display screen 30 according to the distribution of the dates images taken calculated in step S14 (step S16). FIG. 6 shows an example of an image search screen W20 displayed on the display screen 30 according to the embodiment. As shown in FIG. 6, the image search screen W20 includes an image display area W22 and an image-distribution display area W24.

The image-distribution display area W24 displays an image distribution generated according to the distribution of image taking dates calculated in step S14. FIG. 6 shows only the layout of the image-distribution display area W24 and shows no image distribution.

The image display area W22 shows images found under the criteria that are indicated by the user using the image-distribution display area W24. The image display area W22 of FIG. 6 shows no images because no criteria are input and thus no search operation is executed. However, a search operation may be executed with the date of execution of the image search operation as a default criterion to display some image.

Figure 7:
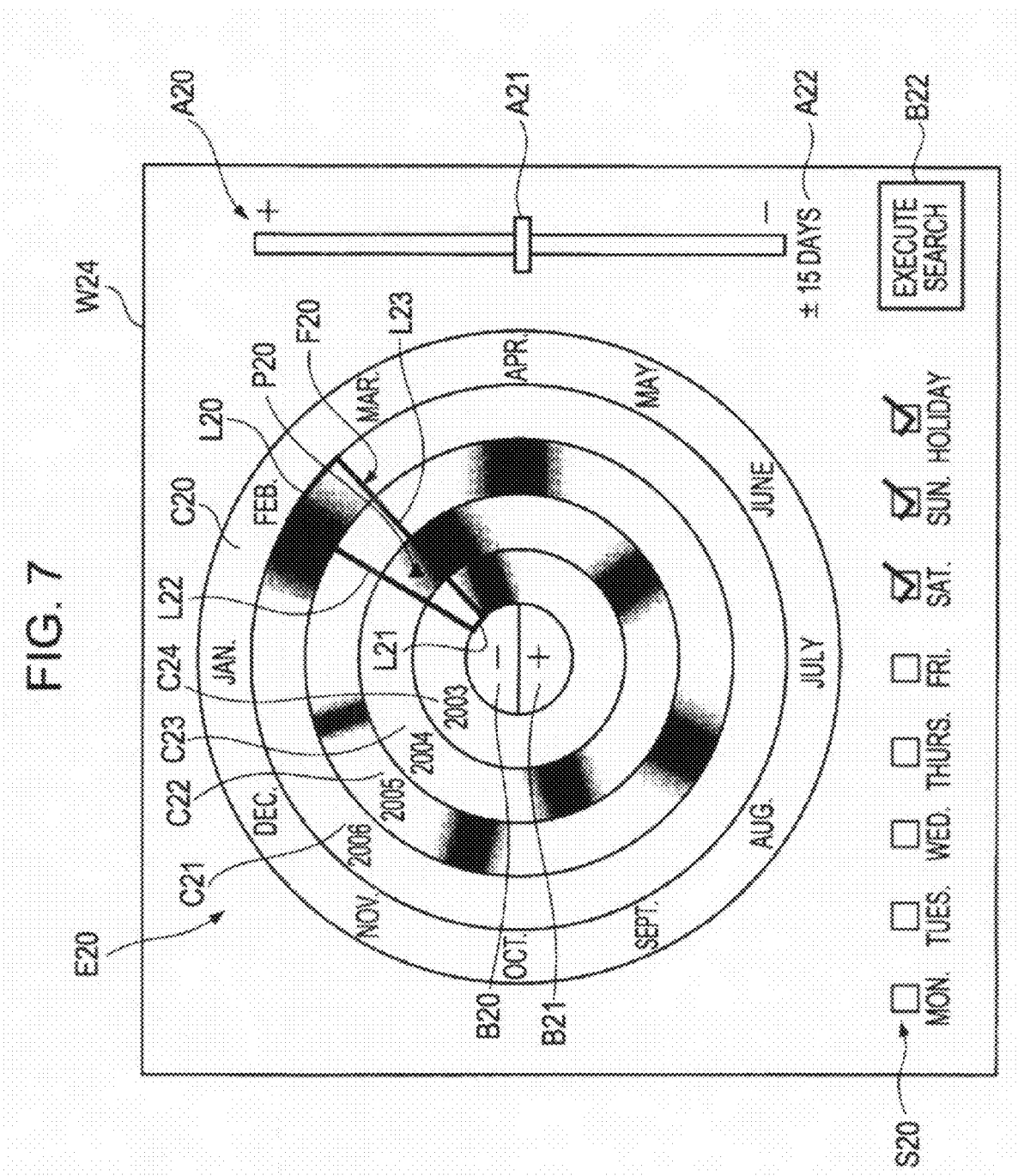
FIG. 7 is an enlarged diagram of the image-distribution display area on the image search screen of FIG. 6.

FIG. 7 is an enlarged diagram of the image-distribution display area W24. As shown in FIG. 7, the image-distribution display area W24 displays an image-taking-date representing section E20 in which dates images taken are shown. The image-taking-date representing section E20 shows concentric circles, or in other words, a plurality of circumferential rings like annual rings.

In the example of FIG. 7, the outermost circumferential ring C20 shows the months from January to December. The month representation indicates the month of image taking.

January is assigned to 12 o'clock position; and July is assigned to 6 o'clock position. Between December and July are assigned February to June and August to December, respectively, at an equal central angle, that is, at a central angle of 30 degrees for one month. Thus, the image-taking-date representing section E20 shows the lapse of months from January to December circumferentially.

Inside the outermost circumferential ring C20, circumferential rings C21, C22, C23, and C24 are shown in sequence from the outer circumferential ring. In this example, the circumferential ring C21 represents the year 2006, the circumferential ring C22 represents the year 2005, the circumferential ring C23 represents the year 2004, and the circumferential ring C24 represents the year 2003. Thus, of the circumferential rings C21 to C24, the outermost circumferential ring C21 represents this year, and dates back to the past toward the inner circumferential ring. In other words, the image-taking-date representing section E20 shows the lapse of years radially.

Alternatively, it is also possible that the circumferential rings C21 to C24 may represent years in chronological order from the outermost circumferential ring to the innermost circumferential ring in reverse to the example of FIG. 7. While the lines at the boundaries of the circumferential rings C20 to C24 are present for the purpose of description, they may be omitted when actually displayed on the display screen 30.

In the embodiment, the number of the circumferential rings representing years can be changed freely by the user. Specifically, in the example of FIG. 7, four circumferential rings (for four years) are shown. More or fewer circumferential rings (years) may be represented.

When an image is present in the corresponding part of the circumferential rings C21 to C24, the part is displayed in a color different from the periphery. The larger the number of images on the date, the darker the color is. FIG. 7 shows an example in which a lot of images are present in the middle of February in 2006, while no image is present in March in 2006.

In this embodiment, to express the amount of the images with the light and shade of a specific color, the number X of the dates of image taking of the year and the number Y of the images taken during the year are calculated using the image database DB10. The average number AV of images taken in one day of the year is calculated by Y/X, and the average number AV of one day is set to the middle of the brightness of the specific color, 128. Here, assume that the brightness of the specific color can be set in the range from 0 to 255. The circumferential rings C21 to C24 are colored in a specific color so that the maximum number of images of the dotted line of the normal distribution in FIG. 5 becomes the brightness 255 of the specific color and that the number of images, 0, becomes the brightness 0 of the specific color. Thus, the presence of images and the number thereof can be expressed by the light and shade of a specific color.

A triangular pointer P20 indicates the center of a desired date. In other words, image search is executed around the date indicated by the pointer P20. In this embodiment, the pointer P20 can be dragged by the user with a mouse. The shape of the pointer P20 may not necessarily be a triangle but may be any shape such as a rectangle, circle, or star. The color thereof can also be selected freely so as to be discriminated from the periphery. For example, in this embodiment, the pointer P20 is colored in green, the presence and number of images are expressed in the light and shade of violet, and the background is colored in gray.

A sectored search-range representing section F20 which represents a search range is superposed on the image-taking-date representing section E20. In this embodiment, the center of the sectored search-range representing section F20 agrees with the center of the image-taking-date representing section E20.

The sectored search-range representing section F20 indicates the size of the search range around the pointer P20. Specifically, at the execution of a search operation, images taken on the dates in the sectored search-range representing section F20 is displayed in the image display area W22. In this embodiment, the outer frame portions L20 to L23 of the sectored search-range representing section F20 are displayed in red or the like, while they may be displayed in another distinguishable form such as bold lines or broken lines.

Figure 8:
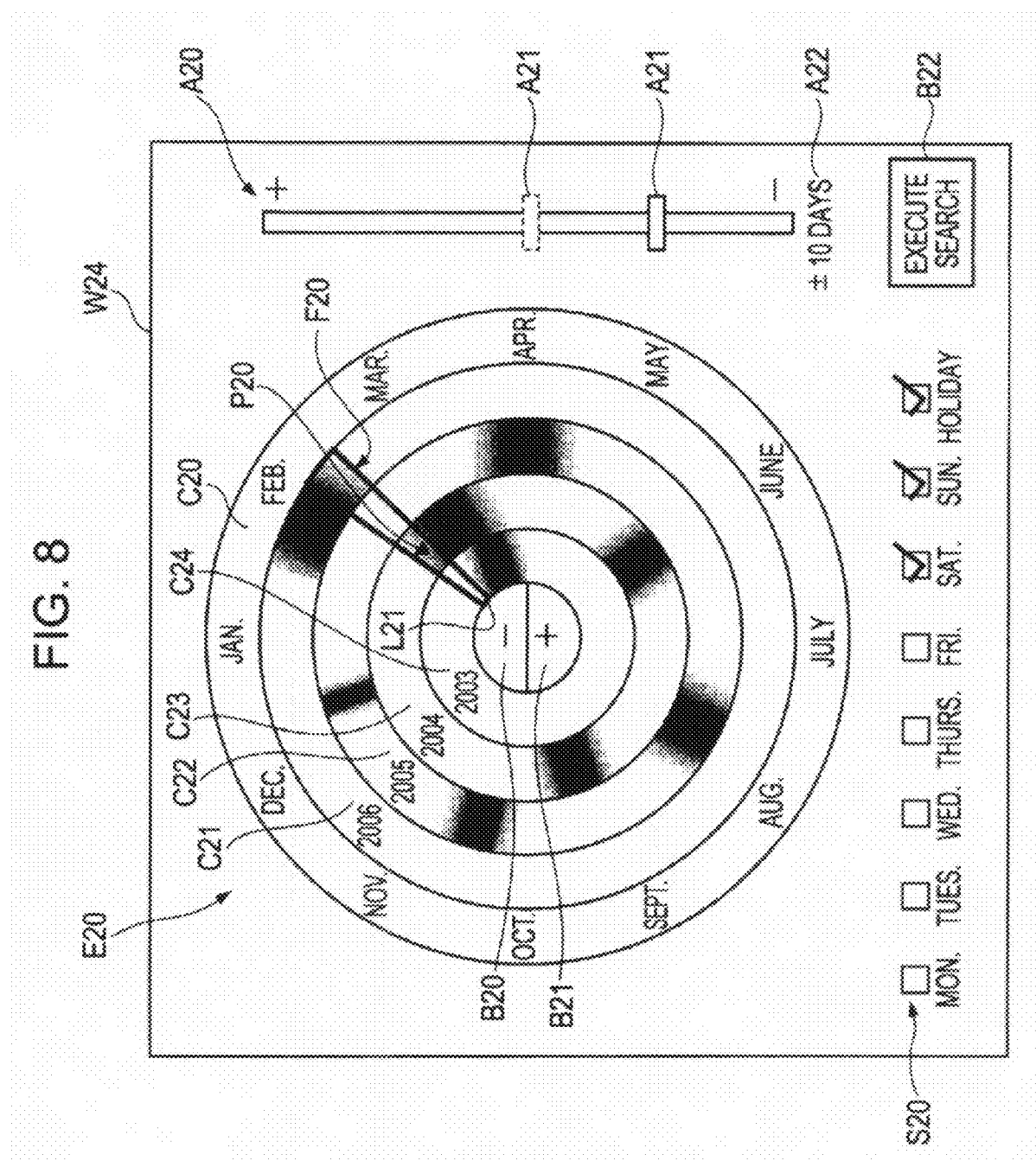
FIG. 8 is a diagram of the image-distribution display area of FIG. 7 in which the ambiguity is controlled to the negative side.
Figure 9:
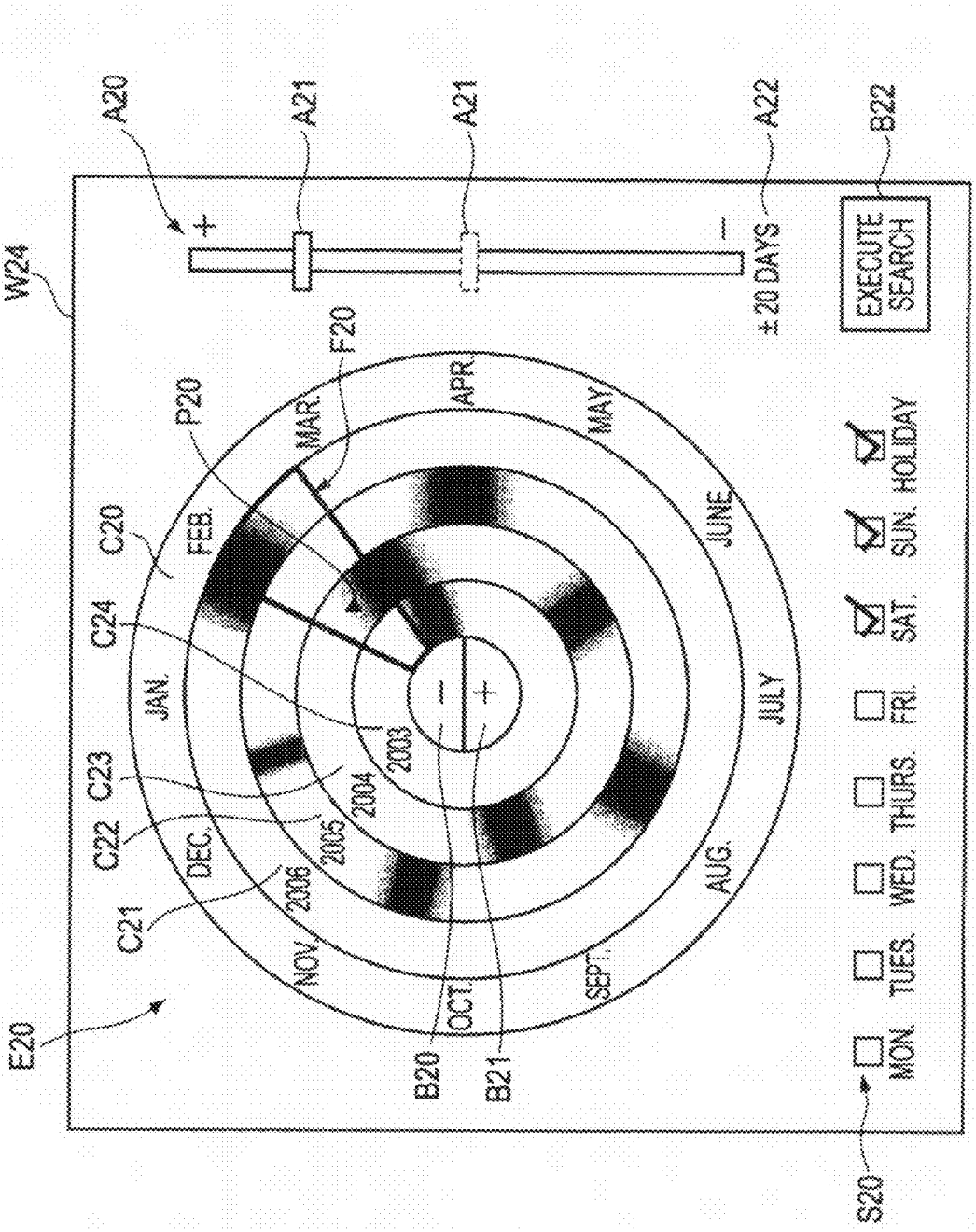
FIG. 9 is a diagram of the image-distribution display area of FIG. 7 in which the ambiguity is controlled to the positive side.

The size of the central angle of the sectored search-range representing section F20 can be changed by operating an ambiguity control section A20. As shown in FIG. 8, when the user drugs a control button A21 of the ambiguity control section A20 to the negative side, the central angle of the sectored search-range representing section F20 is decreased. In contrast, as shown in FIG. 9, when the user drugs the adjusting button A21 to the positive side, the central angle of the sectored search-range representing section F20 is increased. In other words, when the user adjusts the range of the date the desired image is taken, with the ambiguity control section A20, the central angle of the sectored search-range representing section F20 is changed correspondingly. In this embodiment, the setting of the ambiguity control section A20 is displayed on a value indicator A22. In this embodiment, the default of the ambiguity control section A20 is set at ±15 as shown in FIG. 7. In the example of FIG. 8, the setting of the ambiguity control section A20 is set at ±10 and, in the example of FIG. 9, the setting of the ambiguity control section A20 is set at ±20.

As shown in FIGS. 7 to 9, the central angle of the sectored search-range representing section F20 is changed in such a manner that the line connecting the pointer P20 and the center of the concentric circle divides the direction of the lapse of time of the sectored search-range representing section F20 into two parts. In this embodiment, particularly, the sectored search-range representing section F20 is drawn so that the line connecting the pointer P20 and the center of the concentric circle divides the central angle of the sector of the search-range representing section F20. This indicates that the range of the date on which the desired image is taken in the positive direction and the range of the date on which the desired image is taken in the negative direction are the same.

When the central angle of the sectored search-range representing section F20 is reduced, the search criteria are reduced, so that images apart from the date indicated by the pointer P20 cannot be displayed in the image display area W22. In contrast, when the central angle of the sectored search-range representing section F20 is increased, the search criteria are expanded, so that images apart from the date at the pointer P20 can also be displayed in the image display area W22.

When the user moves the pointer P20, the sectored search-range representing section F20 is also moved with the movement of the pointer P20. Here the central angle of the sectored search-range representing section F20 is not changed before and after the movement. Also when the sectored search-range representing section F20 is displayed after the movement, the central angle of the sectored search-range representing section F20 is divided into two parts by the line connecting the pointer P20 and the center of the concentric circle.

Figure 10:
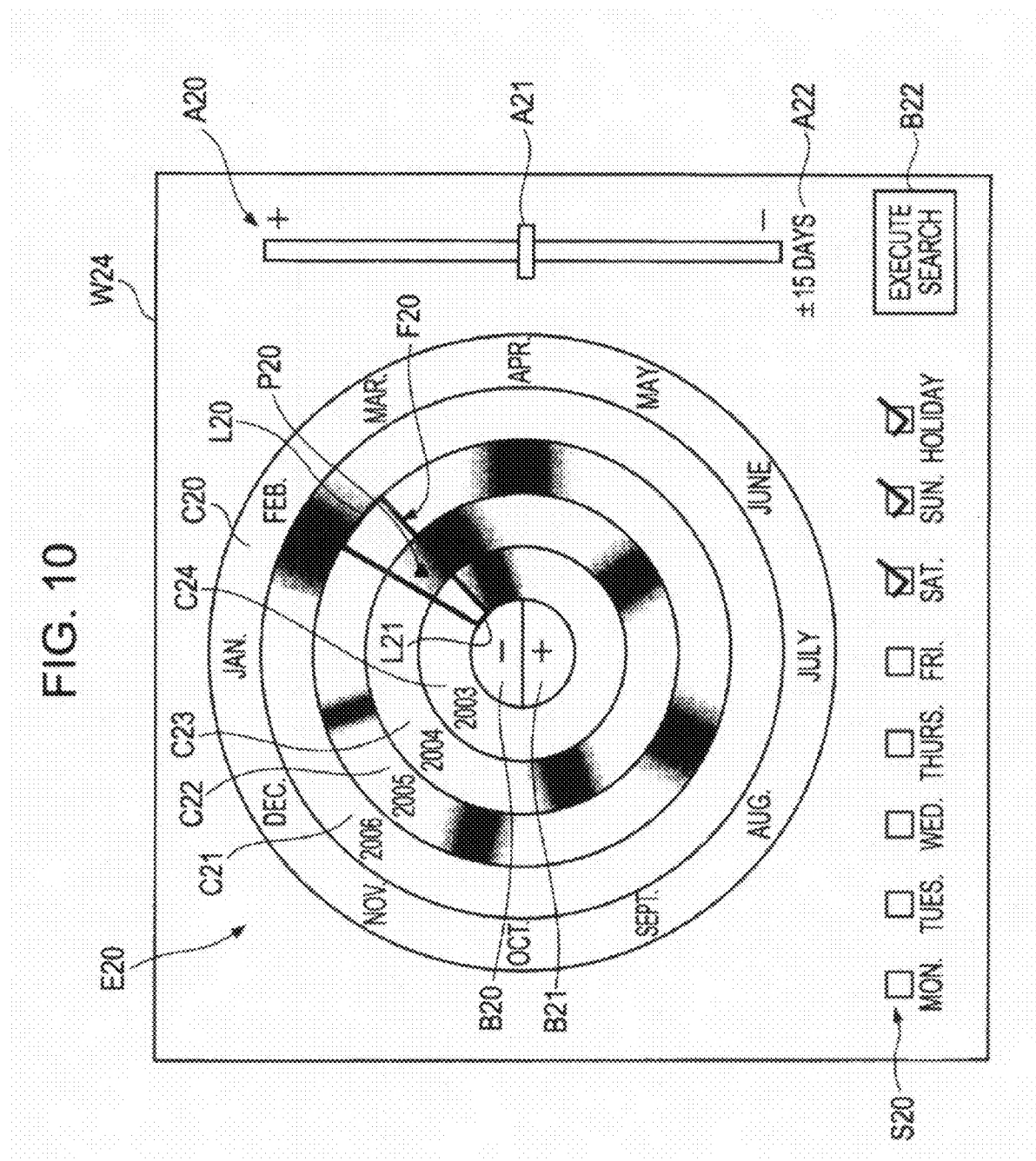
FIG. 10 is a diagram of the image-distribution display area of FIG. 7 in which the year 2006 is removed from the search object.

In this embodiment, the user can control the range of the year in which the desired image is taken. For example, when the user clicks on the outer arc L20 of the sectored search-range representing section F20 with a mouse, and then clicks on a minus button B20 at the center of the concentric circle in the image-distribution display area W24 shown in FIG. 7, the images taken in 2006 can be removed from the search object as shown in FIG. 10. In other words, the user can eliminate the images taken in 2006 so as not to be displayed on the image display area W22. When the user further clicks on the minus button B20 in this state, the images in 2005 can be removed from the search object. In contrast, when the user clicks on a plus button B21 in the state of FIG. 10, the images in 2006 can be included in the search object again. In other words, every time the user clicks on the minus button B20 or the plus button B21 while selecting the arc L20 of the sectored search-range representing section F20, the user can move the arc L20 to the outside or the inside.

Figure 11:
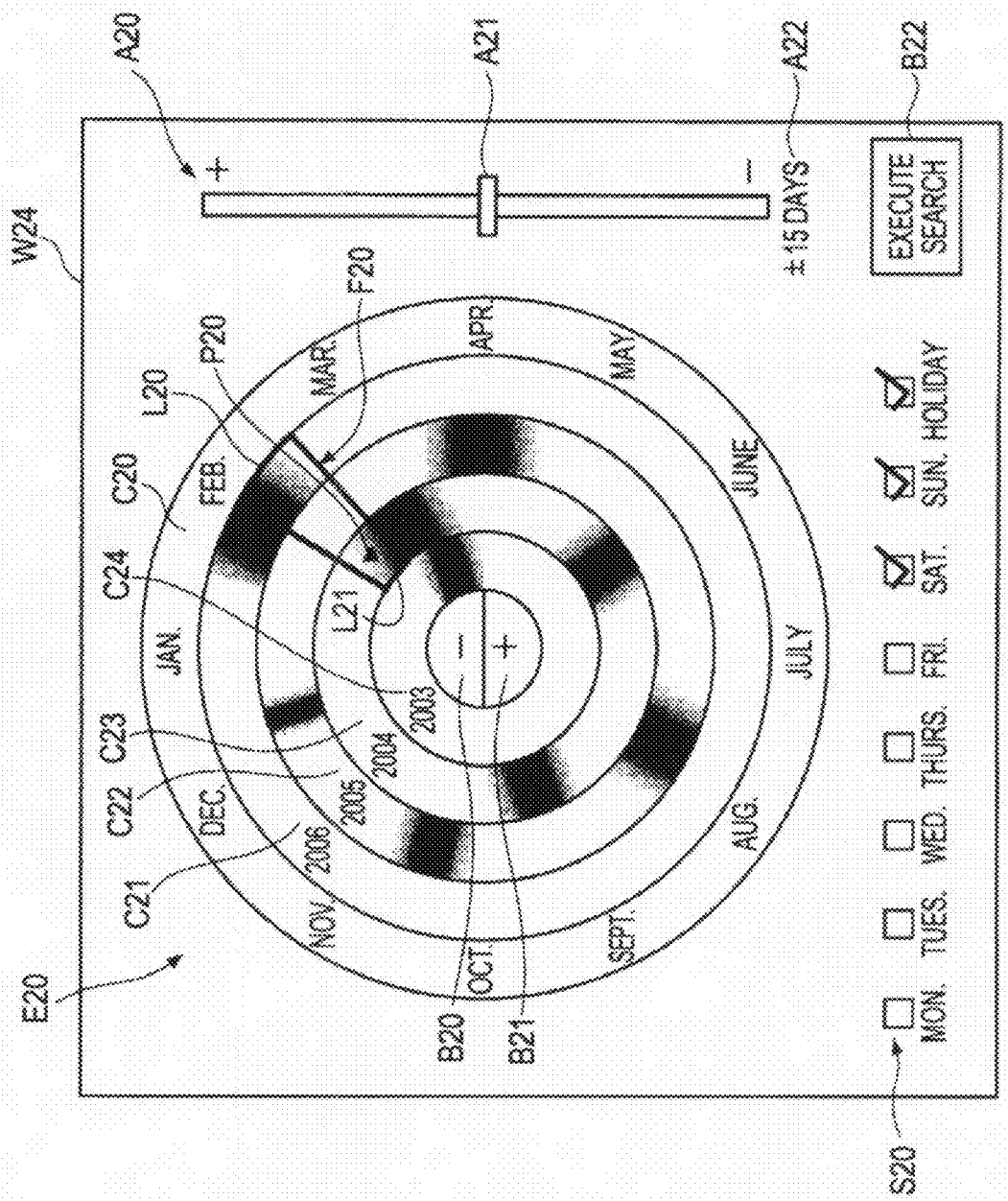
FIG. 11 is a diagram of the image-distribution display area of FIG. 7 in which the year 2003 is removed from the search object.

Similarly, when the user clicks on the inner arc L21 of the sectored search-range representing section F20 with a mouse, and then clicks on the plus button B21 at the center of the concentric circle in the image-distribution display area W24 shown in FIG. 7, the images taken in 2003 can be removed from the search object as shown in FIG. 11. In other words, the user can eliminate the images taken in 2003 so as not to be displayed on the image display area W22. When the user further clicks on the plus button B21 in this state, the images in 2004 can be removed from the search object. In contrast, when the user clicks on the minus button B20 in this state, the images in 2003 can be included in the search object again. In other words, every time the user clicks on the minus button B20 or the plus button B21 while selecting the arc L21 of the sectored search-range representing section F20, the user can move the arc L21 to the outside or the inside.

This shows that the radial size of the sectored search-range representing section F20 superposed on the image-taking-date representing section E20 represents the range of the year in which a desired image is taken. When the user controls the range of the year in which a desired image is taken, the radial size of the sectored search-range representing section F20 is also changed correspondingly.

More strictly, in drawing the sectored search-range representing section F20, the center is agreed with the center of the image-taking-date representing section E20, the central angle is agreed with the range of the date on which the desired image is taken, and the arc L20 is drawn so as to correspond to the latest year in the range of the year in which the desired image is taken. Then, the center is agreed with the center of the image-taking-date representing section E20, the central angle is agreed with the range of the date on which the desired image is taken, and the arc L21 is drawn so as to correspond to the oldest year in the range of the year in which the desired image is taken. Both ends of the two arcs L20 and L21 are connected with parallel straight lines L22 and L23. That is, one end of the arc L20 and one end of the arc L21 are connected together, with the straight line L22, and the other end of the arc L20 and the other end of the arc L21 are connected together, with the straight line L23. To control the range of the year in which the desired image is taken, the user adjusts the arc L20 and/or the arc L21 so that the sectored search-range representing section F20 includes the circumferential ring of the year of the search object but does not include the circumferential ring of the year that is not searched.

In this embodiment, the image-distribution display area W24 further includes a day-of-week selecting section S20. The user can designate the day of week of the desired image with the day-of-week selecting section S20. In this embodiment, the day-of-week designation includes Holiday in addition to Monday to Sunday. Accordingly, the user can select Saturday, Sunday, and holiday. Accordingly, if the user remembers that the image is taken on a day off, the user can designate Saturday, Sunday, and Holiday, as shown in FIG. 7. However, the option of the Holiday is not always necessary and can be omitted. Another option is that Monday to Friday are collected into weekdays, and Saturday, Sunday, and holidays are collected into days off.

The day-of-week selecting section S20 of this embodiment allows the user to select a specific day of week by clicking on a check box with a mouse. When the user inputs criteria on the day-of-week selecting section S20, the image database DB10 is searched for the day of week and holidays, and only the images taken on the designated day of week are displayed on the image display area W22. When no day of week is designated in the day-of-week selecting section S20, all the days of week are displayed in the image display area W22.

After completion of the input of search criteria in the image-distribution display area W24, the user clicks on a search execution button B22 with a mouse. Accordingly, as shown in FIG. 2, the image processing unit 10 determines whether an instruction to execute search has been input after the image search screen W20 is displayed (step S18). When the instruction to execute search has not been input (step S18: NO), the image processing unit 10 completes the designation of search criteria on the image search screen W20, and stands by while repeating step S18 until an instruction to execute search is input.

when an instruction to execute search is input (step S18: YES), the image processing unit 10 searches images according to the input criteria and displays images that meet the search criteria on the image display area W22 (step S20). The search for images that agree with the search criteria is executed with reference to the image database DB10. Specifically, since the dates, days of week, and holidays that images are taken are stored in the image database DB10, image search is executed on the bases of the stored data.

Figure 12:
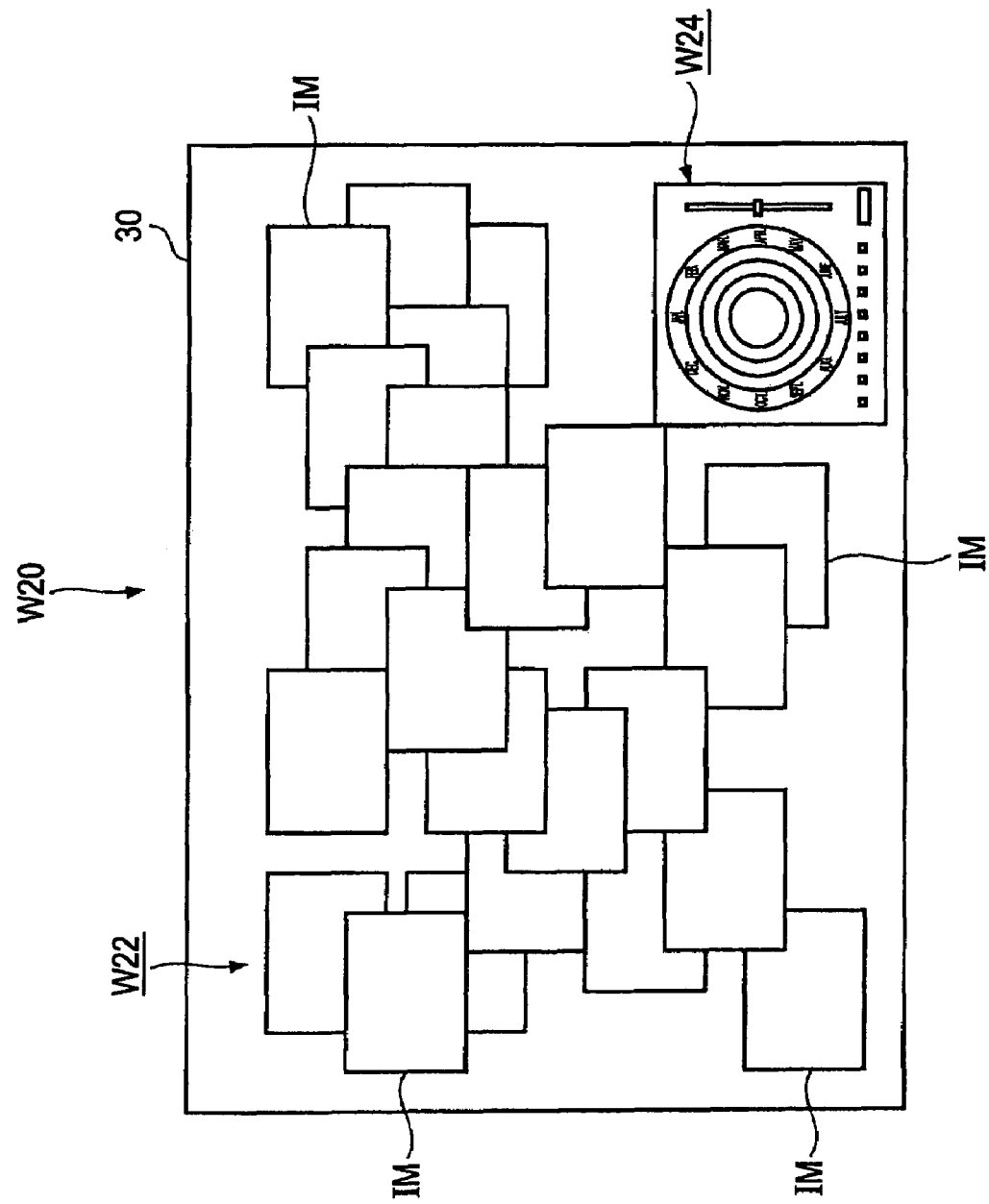
FIG. 12 is a diagram of an example of the image search screen after execution of search.

FIG. 12 is a diagram of an example of the image search screen W20 displayed on the display screen 30. As shown in FIG. 12, the image display area W22 of the image search screen W20 displays images that meet the search criteria.

In this embodiment, images IM displayed in the image display area W22 are thumbnail images, which are displayed by reading the file designated by "Thumbnail" in the image database DB10. The images IM are displayed at random. Therefore, some images IM overlap and some images IM are invisible because they are completely placed one on another.

When there are too many images IM to be displayed on the image display area W22, some of them may be thinned out by one method or another, not all the images that meet the search criteria being displayed. For example, images taken on the same day may be thinned out from images that meet the search criteria. Images may be thinned out so that only one image for one day is displayed or images may be thinned out at random into one half or one third. Alternatively, one image area for one image is provided for images of the same date, and the images displayed in the image area may be switched in sequence as a slide show. That is, images to be displayed in the image display area W22 may be thinned out and the thinned out images may be displayed as a slide show.

Examples of the way of thinning out images are as follows: if the times images taken, if can be acquired, are close to one another in one day, either only one image may be selected or all the images may be switched in a slide show. For example, assume that the earliest time is 1 PM and the latest time is 6 PM, during which 20 images are taken from 1 PM to 2 PM, five images are taken from 3 PM to 3:30 PM, and two images are taken from 5:50 PM to 6 PM. In the case where images are taken in such three time zones, when images are simply selected at random, the two images taken from 5:50 PM to 6 PM are not displayed with high possibility. Therefore, at least one image selected from each of three time zones at random may be display in the image display area W22. In this case, for example, when images are evenly distributed across all the time zones of one day, desired images may be selected at random from the whole day regarded as one group.

In displaying images IM in the image display area W22, it is also possible to set the transparency of the images IM lower as the date of image taking is closer to the pointer P20, and to set the transparency higher as the date is apart from the pointer P20. With this representation, the user can recognize that transparent images are far from the date of the pointer P20 that the user pointed, and in contrast, nontransparent clear images are close to the date of the pointer P20.

Images IM that completely meet the pointer P20 which is a criterion designated by the user may be discriminated from other images colored in red or by another way.

Figure 13:
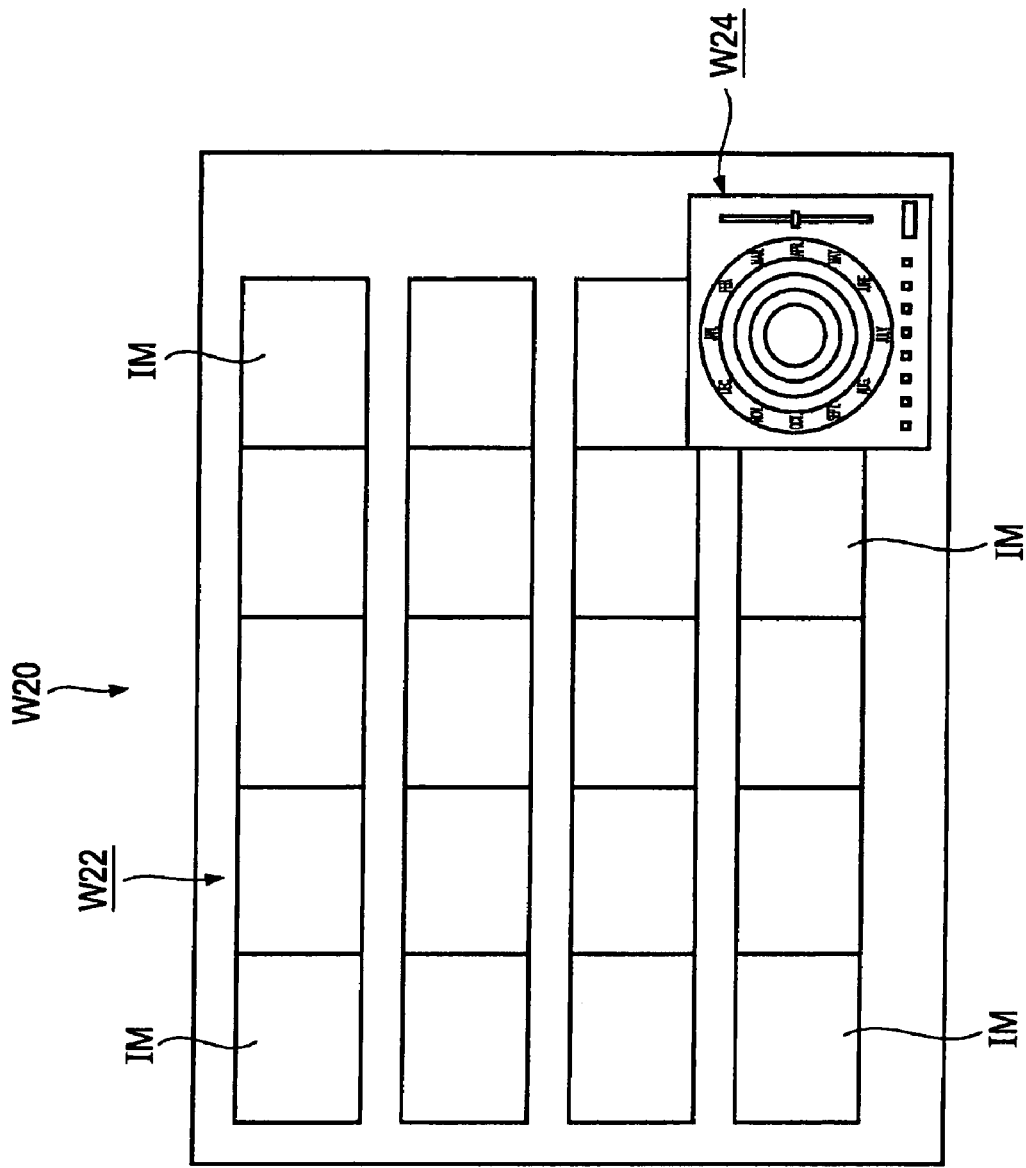
FIG. 13 is a diagram of a modification of the image search screen after execution of search.

The images IM may not be displayed at random in the image display area W22 and may be displayed in alignment, as shown in FIG. 13. For example, the image IM at the uppermost left corner may be set closest to the date of the pointer P20, and images IM closer to the right and lower are set far from the date of the pointer P20. Also in the case where the images IM are aligned as in FIG. 13, the transparency of the images IM may be decreased as the date is closer to the pointer P20, and be increased as the date is apart from the pointer P20.

Figure 14:
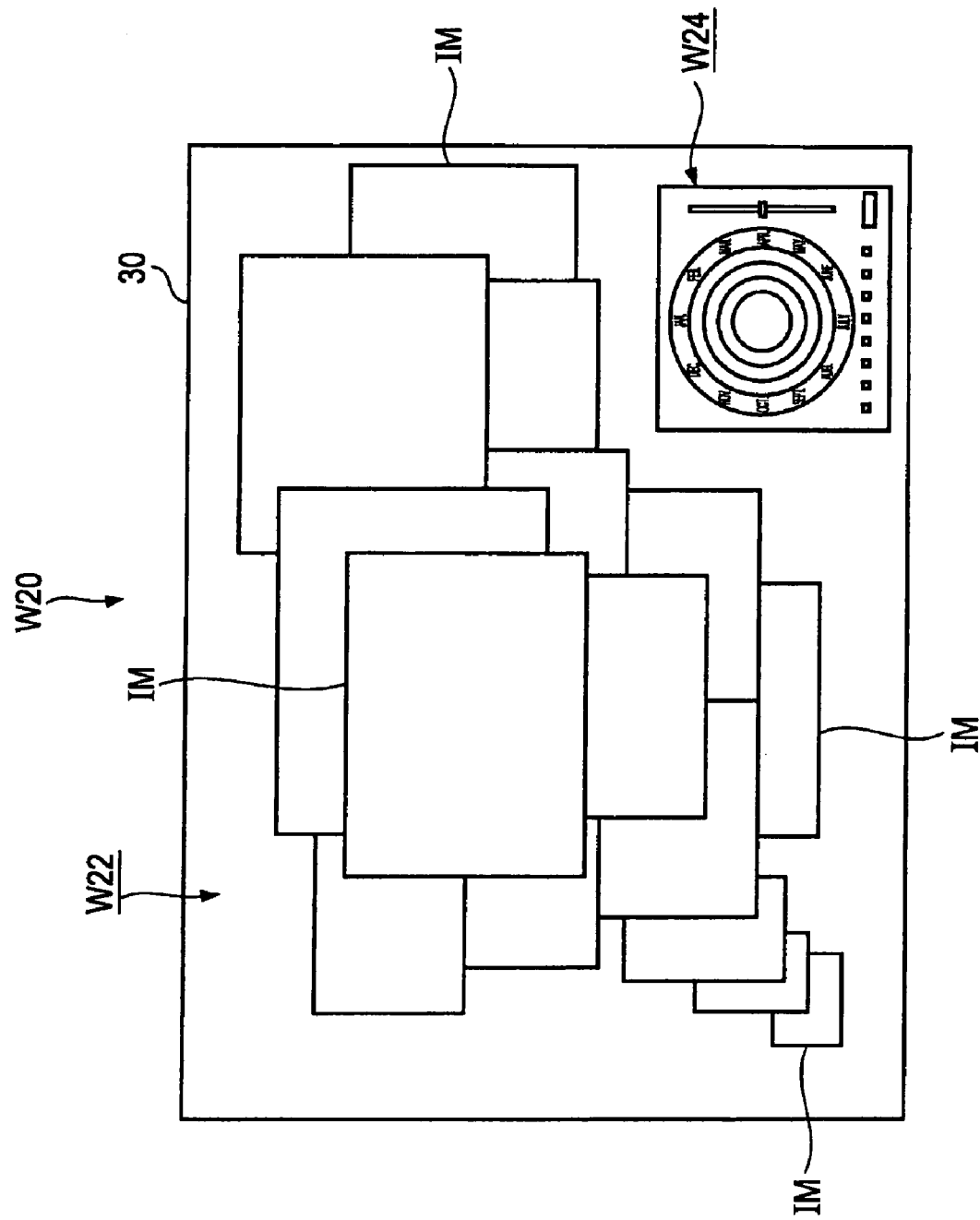
FIG. 14 is a diagram of another modification of the image search screen after execution of search.

Alternately, as shown in FIG. 14, the images IM displayed in the image display area W22 may be changed in size so as to show how the images IM are apart from the date designated by the pointer P20. Specifically, the closer to the date designated by the pointer P20, the larger the image is displayed, while the farther from the date designated by the pointer P20, the smaller the image is displayed.

Next, as shown in FIG. 2, the image processing unit 10 determines whether the user has selected an image (step S22). Specifically, when a desired image is found in the image display area W22, the user selects the image by double-clicking it with a mouse. Thus, the image processing unit 10 determines whether the selection is executed. When no image selection has been made (step S22: NO), the image processing unit 10 determines again whether the user gives an instruction to execute search under changed search criteria (step S24). When no instruction is given (step S24: NO), the image processing unit 10 repeats the process from the step S22.

On the other hand, when the user gives an instruction again (step S24: YES), the image processing unit 10 returns to step S20, and searches for images under the designated search criteria and displays images that meet the search criteria in the image display area W22.

In contrast, when it is determined in step S22 that images have been selected (step S22: YES), the selected images are displayed on enlarged scale (step S26). In the enlarged display, only the selected images may be displayed or, alternatively, images taken on the same day as the selected images may be switched one by one according to the instruction of the user or automatically. As a further alternative, images in the same folder as the selected images may be displayed one by one according to the user's instruction or automatically.

The enlarged image display is only one example of the processes after the user finds desired images. Actually, the image processing unit 10 can execute various processes to the selected images. In this embodiment, when the user selects an image on the image display area W22, the center of search shifts to the selected image. Specifically, the pointer P20 in the sectored search-range representing section F20 of the image-distribution display area W24 shifts to the date of the selected image. However, the shift of the pointer P20 may not be omitted. Alternatively, the pointer P20 may be fixed; instead, the image-taking-date representing section E20 may be shifted.

Thus, with the image processing unit 10 according to the embodiment, the user can easily find out desired images from high volumes of images stored from the past to date, and can display them on the display screen 30. In other words, the user can find out images by the sense of the season that the user remembers. Accordingly, even if the user has no correct memory on the year of image taking, such as two years ago or three years ago, the user can search transversely for images taken in the same season or month across several years. Moreover, such search method allows the user to recall the memory, thereby increasing the efficiency of search.

The image processing unit 10 according to this embodiment allows the user to search for images with search criteria including the day of week and holiday on which the images are taken. This allows the user to search for images according to user's memory such as images taken on business or leisure.

Moreover, the presence and volume of the images can be expressed by changes in the brightness of a specific color, that is, changes in light and shade in the image-distribution display area W24. Accordingly, the user can sense the presence and volume of the images through intuition.

Second Embodiment

In the first embodiment, the presence and volume of the images in the image-taking-date representing section E20 are expressed by changes in the light and shade of a specific color. In contrast, in a second embodiment, the presence and volume of the images are expressed by changes in hue. The difference from the first embodiment will be described hereinbelow.

Figure 15:
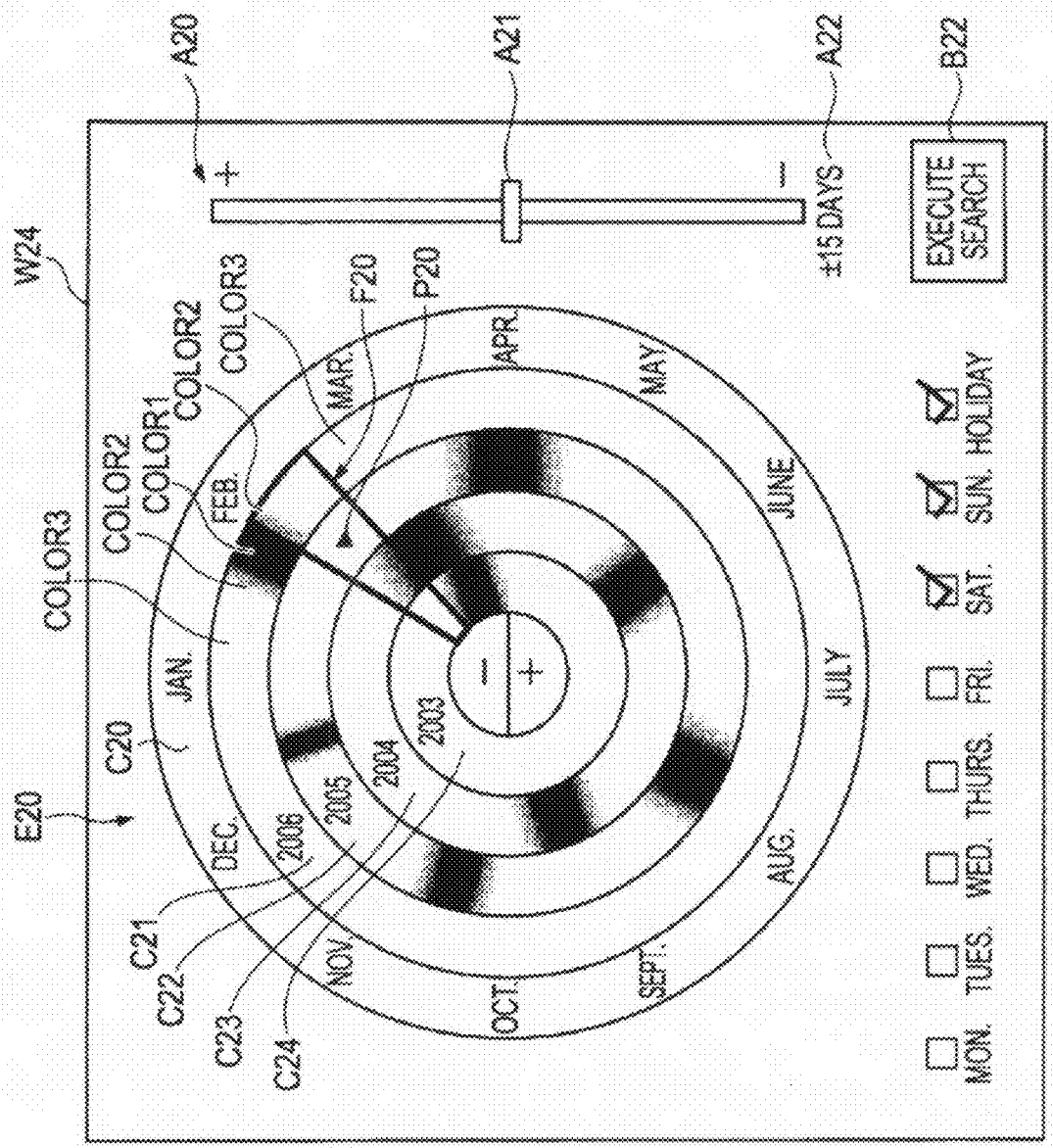
FIG. 15 is a diagram of an example of the structure of an image-distribution display area according to a second embodiment.

FIG. 15 shows an example of the structure of an image-distribution display area W24 according to the second embodiment. As shown in FIG. 15, also the image-taking-date representing section E20 of the second embodiment has circumferential rings C20 to C24, in which the lapse of months from January to December is expressed circumferentially and the lapse of years is expressed radially.

In this embodiment, the presence and number of the images are expressed by changes in the hue of the circumferential rings C21 to C24. For example, in the circumferential rings C21 to C24 of this embodiment, the area corresponding to the date on which no image is present is expressed in blue, while the area corresponding to the date on which a lot of images are present is expressed in red. The area corresponding to the date on which an intermediate number of images are present is expressed in violet, or a color between blue and red. In other words, the area corresponding to the date on which no image is present is expressed in blue, which changes to violet as the number of images increases, and becomes red in the area corresponding to the date on which the maximum number of images are present.

For example, the area of color 1 in FIG. 15 is expressed in red because it corresponds to the date on which the maximum number of images in 2006 are present; the area of color 2 is expressed in violet because it corresponds to the date on which the number of images is smaller than the area of color 1; and the area of color 3 is expressed in blue because it corresponds to the date on which no image is present.

The changes in hue from blue to red are corrected using a normal distribution as in the first embodiment. Thus, the changes in hue can be expressed by the gradual change from blue to red.

Thus, with the image processing unit 10 according to the second embodiment, the presence and volume of the images are expressed by changes in hue, or changes in color, in the image-distribution display area W24. This allows the user to read the presence and volume of the images through intuition.

Third Embodiment

In the first embodiment, the presence and volume of the images are expressed by changes in light and shade in the image-taking-date representing section E20. In contrast, in a third embodiment, the presence and volume of the images are expressed by the speed of flashing. The difference from the first embodiment will be described hereinbelow.

Figure 16:
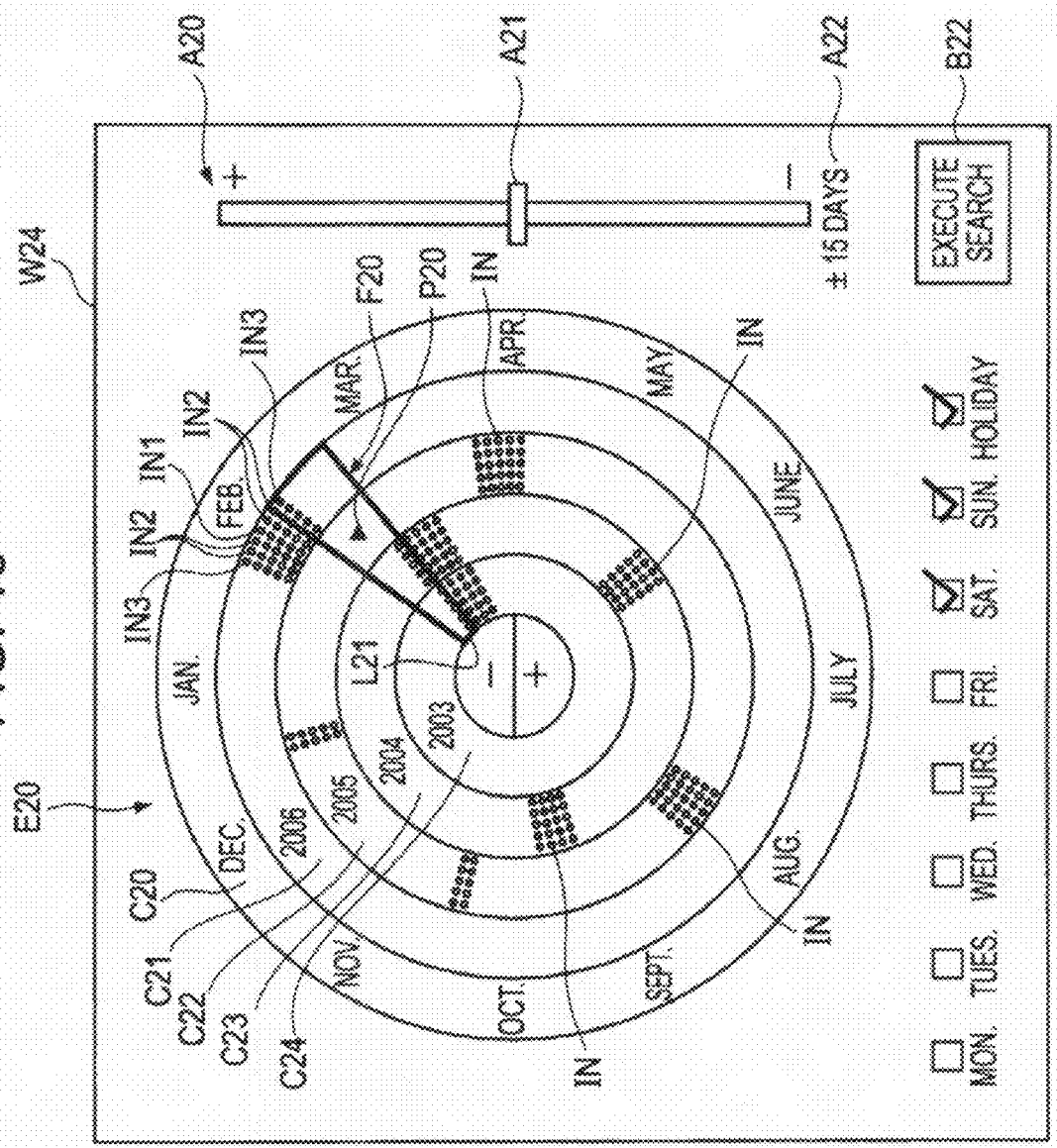
FIG. 16 is a diagram of an example of the structure of an image-distribution display area according to a third embodiment.

FIG. 16 shows an example of the structure of an image-distribution display area W24 according to the third embodiment. As shown in FIG. 16, also the image-taking-date representing section E20 of the third embodiment has circumferential rings C20 to C24, in which the lapse of months from January to December is expressed circumferentially and the lapse of years is expressed radially.

In this embodiment, the presence and number of the images are expressed by changes in the flashing speed of an image-presence representing section IN of the circumferential rings C21 to C24. For example, in the circumferential rings C21 to C24 of this embodiment, the area corresponding to the date on which no image is present is expressed in gray, while the area corresponding to the date on which images are present is expressed by the dot-like image-presence representing section IN.

The dot-like image-presence representing section IN flashes. The flashing speed increases as the number of images increases and decreases as the number of images decreases. For example, an image-presence representing section IN1 in FIG. 16 flashes at the highest speed in 2006 because it corresponds to the date on which the maximum number of images are present; an image-presence representing section IN2 flashes at a speed a little lower than the dot-like image-presence representing section IN1 because it corresponds to the date on which the number of images is smaller than the image-presence representing section IN1; and an image-presence representing section IN3 flashes at a speed further lower than the image-presence representing section IN2 because it corresponds to the date on which the number of images is further smaller than the image-presence representing section IN2.

The changes in flashing speed are corrected with a normal distribution as in the first embodiment. Thus, the image-presence representing section IN can be expressed by the changes in flashing speed.

Thus, with the image processing unit 10 according to the third embodiment, the presence and volume of the images are expressed by the flashing speed of the image-presence representing section IN in the image-distribution display area W24. This allows the user to read the presence and volume of the images through intuition.

Fourth Embodiment

In the first embodiment, the presence and volume of the images are expressed by changes in the light and shade of a specific color in the image-taking-date representing section E20. In contrast, in a fourth embodiment, the presence and volume of the images are expressed by the thickness of image-presence representing lines. The difference from the first embodiment will be described hereinbelow.

Figure 17:
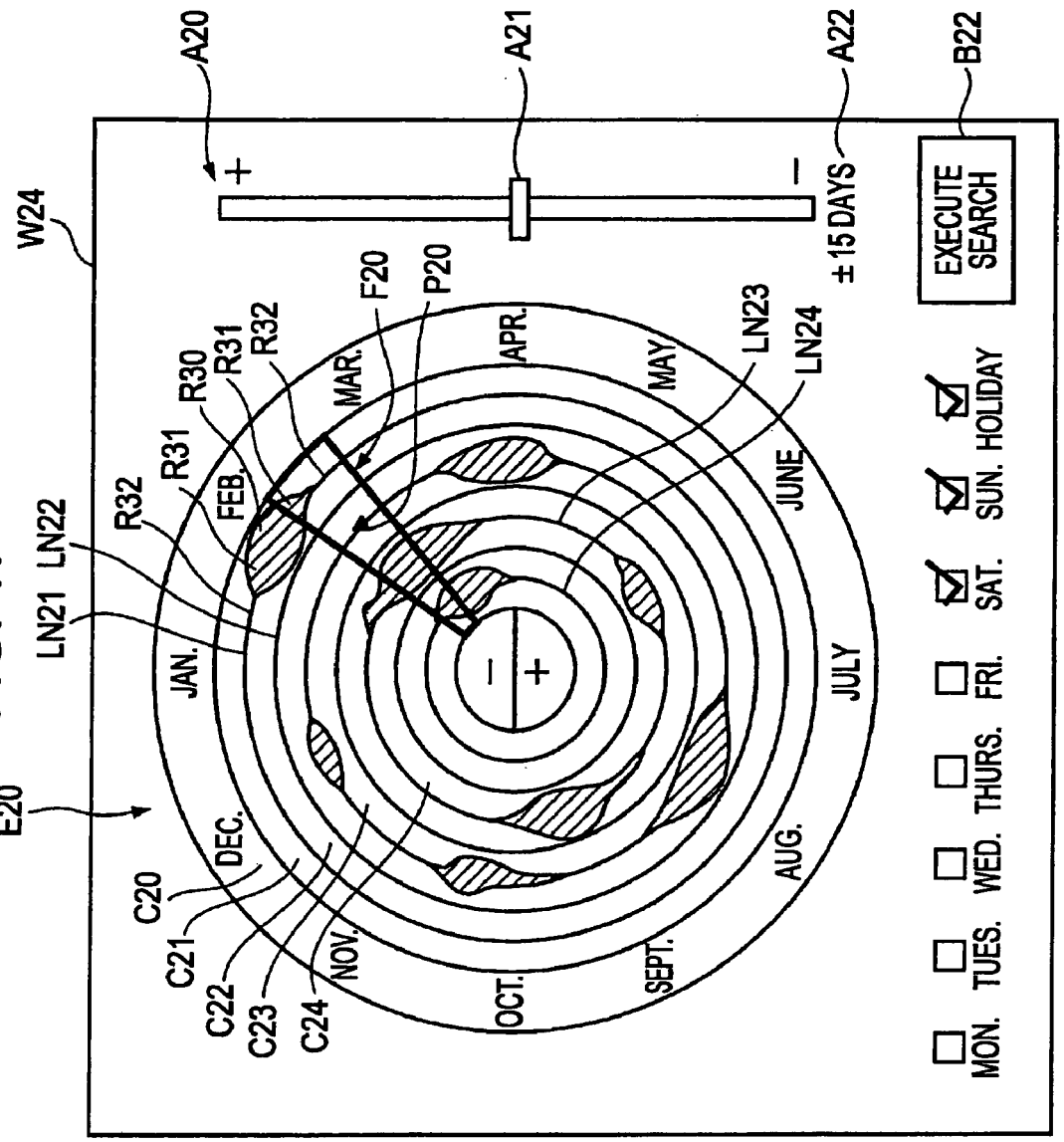
FIG. 17 is a diagram of an example of the structure of an image-distribution display area according to a fourth embodiment.

FIG. 17 shows an example of the structure of an image-distribution display area W24 according to the fourth embodiment. As shown in FIG. 17, also the image-taking-date representing section E20 of the fourth embodiment has circumferential rings C20 to C24, in which the lapse of months from January to December is expressed circumferentially and the lapse of years is expressed radially.

In this embodiment, the presence and number of the images are expressed by the thicknesses of image-presence representing lines LN21 to LN24 of the circumferential rings C21 to C24. For example, in the circumferential rings C21 to C24 of this embodiment, the image-presence representing lines LN21 to LN24 in the area corresponding to the date on which no image is present are extra-fine lines, which increase in thickness with increasing number in the area corresponding to the date on which images are present, and become substantially equal to the widths of the circumferential rings C21 to C24 in the area corresponding to the date on which the number of images is the maximum in the year.

In the example of FIG. 17, the thickness of the image-presence representing line LN21 at an area R30 of the circumferential ring C21 is the maximum in 2006 because it corresponds to the date on which the maximum number of images in 2006 are present; the thickness of the image-presence representing line LN21 at an area R31 is smaller than the area R30 because it corresponds to the date on which the number of images is smaller than the area R30; and the image-presence representing line LN21 at an area R32 becomes an extra-fine line because it corresponds to the date on which no image is present.

The changes in the thicknesses of the image-presence representing lines LN21 to LN24 are corrected with a normal distribution as in the first embodiment. Thus, the image-presence representing lines LN21 to LN24 can be expressed by changes in thicknesses.

Thus, with the image processing unit 10 according to the fourth embodiment, the presence and volume of the images are expressed by the thicknesses of the image-presence representing lines LN21 to LN24 in the image-distribution display area W24. This allows the user to read the presence and volume of the images through intuition.

The invention is not limited to the foregoing embodiments and can be modified variously. For example, in the image search operation, the image database DB is generated every time the image search operation is started. Alternatively, the image database DB10 may be generated and stored before the image search operation is started. For example, the image database DB10 may be updated and stored in the hard disk drive 24 when image data is transferred from an image pickup device such as a digital camera to the image processing unit 10. This allows step S10 and step S12 in the image search operation to be omitted, thereby reducing the waiting time of the user until the image search screen W20 is displayed. Furthermore, when the process of calculation of the distribution in step S14 is also performed in advance and the calculation result is stored in the hard disk drive 24, the waiting time of the user until the image search screen W20 is displayed can be reduced.

In the foregoing embodiments, the image database DB10 generated in advance is used in searching for or displaying images under the search criteria designated by the user. Alternatively, the image database DB10 may not be necessarily used. Specifically, the image processing unit 10 may be configured to search the image data itself stored in the hard disk drive 24, and select images that meet the search criteria, and display them at the point in time when the user designates search criteria and gives instruction to execute search to the image processing unit 10.

The image display area W22 represents the presence and number of the images corresponding to the date image taken with the light and shade of a color or the like. The form of representation is not limited to those. For example, when images are present, very small thumbnails of the images may be displayed at the positions of the corresponding date in the circumferential rings C21 to C24. When the number of the images is large, the thumbnail images may be displayed such that part of them overlap.

In the foregoing embodiments, when the user clicks on the search execution button B22 displayed in the image-distribution display area W24 of the image search screen W20, a search operation based on the search criteria input by the user is executed. Alternatively, an automatic search operation may be made without the need for clicking the search execution button B22 when the user inputs or changes the search criteria.

Figure 18:
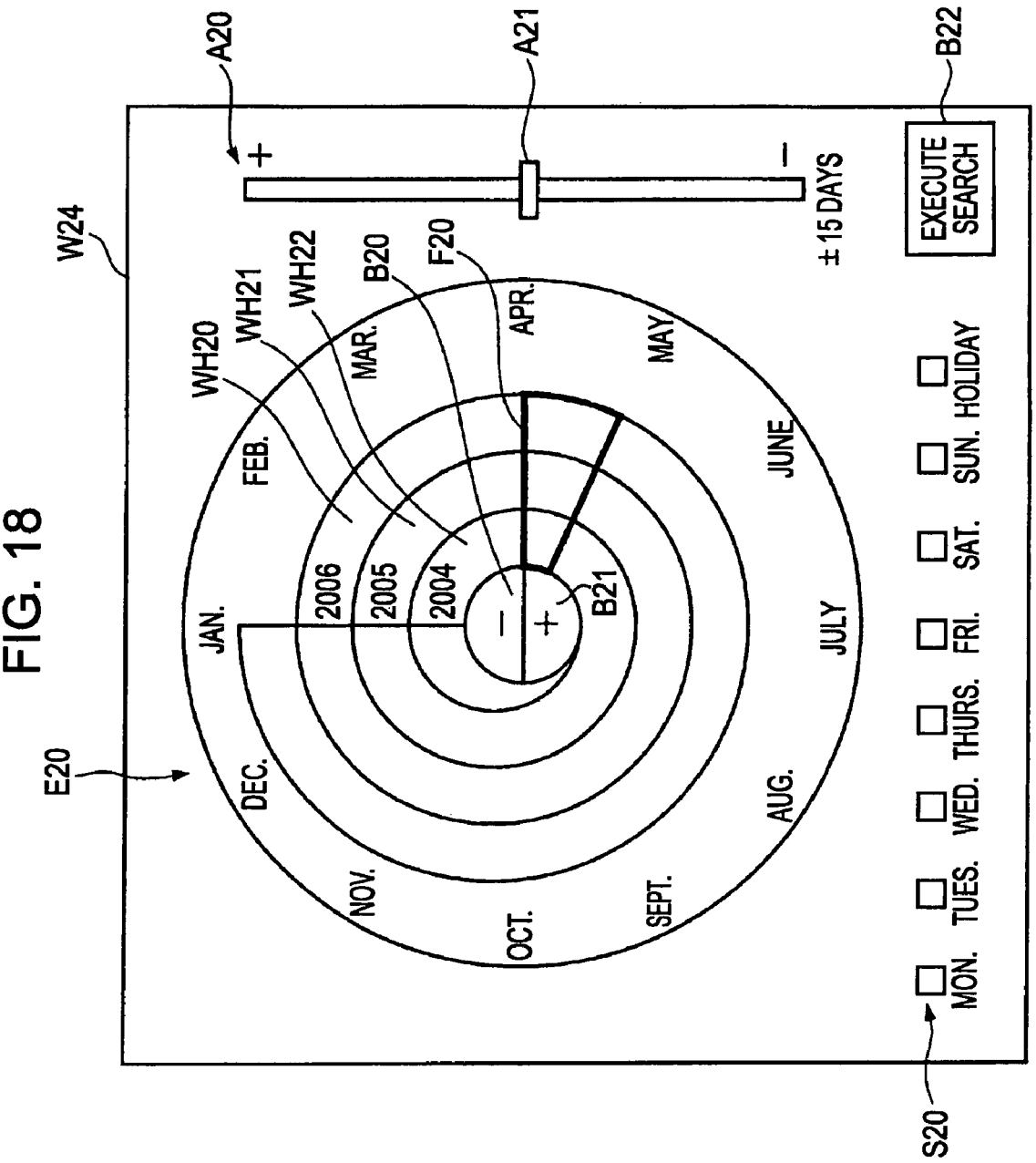
FIG. 18 is a diagram of a modification of the image-distribution display area.

In the foregoing embodiments, the circumferential rings C21 to C24 for representing the date image taken are arranged concentrically. As an alternative, they may be arranged spirally, as shown in FIG. 18. In the example of FIG. 18, the outermost spiral section WH20 represents the presence and number of the images in 2006; a spiral section WH21 that inwardly following the spiral section WH20 represents the presence and number of the images in 2005; and a spiral section WH22 following the spiral section WH21 represents the presence and number of the images in 2004. That is, in the example of FIG. 18, the lapse of time is continuously expressed circumferentially and spirally. One round of the spiral represents the lapse of one year. Thus, also in FIG. 18, the radial direction represents the lapse of year. The form of representing the presence and number of images may adopt any of the first to fourth embodiments.

Figure 19:
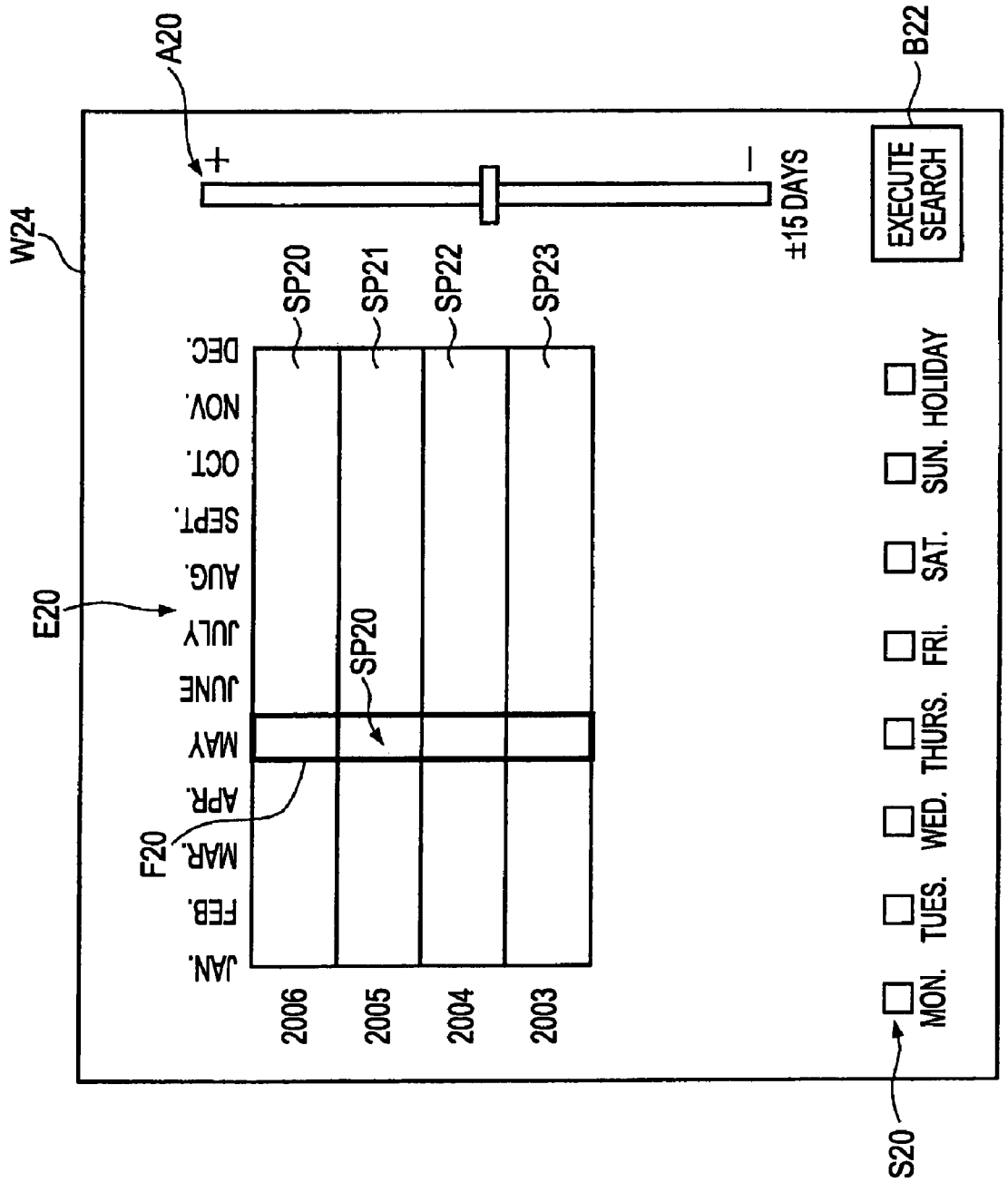
FIG. 19 is a diagram of another modification of the image-distribution display area.

Furthermore, as shown in FIG. 19, the image-taking-date representing section E20 for representing the presence and number of images may be in the form of a bar chart. In the example of FIG. 19, the uppermost bar SP20 represents the presence and number of the images in 2006; a bar SP21 under the SP20 represents the presence and number of the images in 2005; a bar SP22 under the bar21 represents the presence and number of the images in 2004; and a bar SP23 under the SP22 represents the presence and number of the images in 2003.

January to December are assigned from the left to the right above the bar SP20. The search-range representing section F20 in this case is rectangular, whose width represents the degree of the ambiguity of search, and whose height represents the year to be searched. Accordingly, when the user operates the control button A21 of the ambiguity control section A20, the width of the search-range representing section F20 changes. The central axis of the width of the search-range representing section F20 is a vertical axis that passes through the pointer P20 pointed by the user. The form of representing the presence and number of images may adopt any of the first to fourth embodiments.

Thus, the image-taking-date representing section E20 according to embodiments of the invention may be configured to represent the lapse of one year in multiple layers irrespective of whether it is circular or a bar chart, in which one layer represents one year. The search-range representing section F20 is superposed on the image-taking-date representing section E20 so that the range in which the image-taking-date representing section E20 and the search-range representing section F20 overlap represents the range of the date to be searched. Thus, when the user clicks on the search execution button B22, images having the date in the designated search range are searched for.

Figure 20:
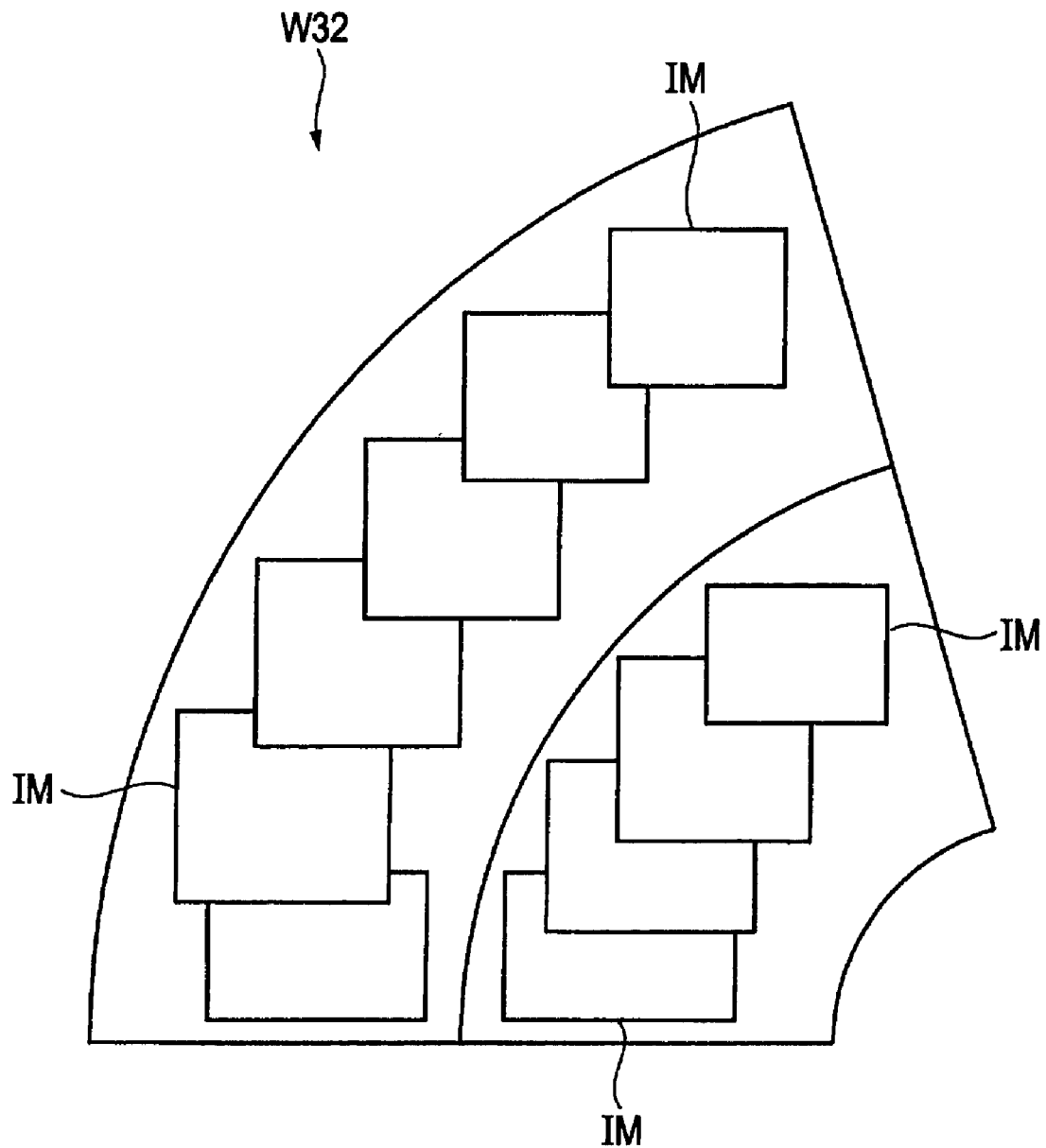
FIG. 20 is a diagram of a modification of the image display area.

As shown in FIG. 20, a sectored image display area W32 may be provided. The image processing unit 10 may be configured such that when the user inputs search criteria in the image-distribution display area W24 and clicks on the search execution button B22, the enlarged sectored image display area W32 is displayed, in which images IM that meet the search criteria are displayed. The display form of the images IM may be modified variously as in the foregoing embodiments. The sectored image display area W32 in FIG. 20 shows a case in which the user designates search criteria in the range of two years. That is, the form of the sectored image display area W32 changes with the search criteria that the user designates, into an enlarged shape of the search-range representing section F20.

The invention can be applied not only to the case where the image data stored in the hard disk drive 24 is still-image data but also to the case of moving-image data. Moving-image data is generated by the user with a home video camera or by recording TV programs with a hard disk drive recorder, and is taken into the image processing unit 10. When displaying moving-image data on the image display area W22, the first frame image of the moving image may be displayed either in a still image or in a moving image. Particularly, since moving-image data taken by a home video camera has no title data, the image processing unit 10 according to embodiments of the invention will significantly improve the convenience of users in search.

When the distribution of the number of moving images is calculated in step S14, one moving-image data item may be counted either as one image or as ten or 20 converted images.

When both moving images and still images are present, moving images and still imaged taken around the same time may be displayed in proximity when images are displayed in the image display area W22. The widespread use of imaging devices capable of taking both moving images and still images will increase user demands for such searching technique.

For moving-image search, in addition to the start date of image taking, the end date may be included in the search object. For example, for a moving image of ten minutes from 11:55 PM, Dec. 31, 2005 to 0:05 AM, Jan. 1, 2006, both Dec. 31, 2005 and Jan. 1, 2006 may be included in the search object. In this case, images in which one of the start data and the end date that meets the search criteria may be displayed in the image display area W22. Alternatively, only when both of the start date and the end date meet the search criteria, images may be displayed in the image display area W22.

As another alternative, the image processing unit 10 may be configured such that the user can designate the size of the desired image (the number of pixels) on the image search screen W20 as a search criterion. For moving image search, the length of shooting time may be included in the search criteria. When the size of the images and the length of shooting are designated by the user, the degree of ambiguity may be included.

In the first embodiment, the presence and number of the images on the corresponding date are represented by changes in the light and shade of a specific color; in the second embodiment, they are represented by changes in hue; in the third embodiment, they are represented by changes in the flashing speed of the image-presence representing section IN; and in the fourth embodiment, they are represented by changes in the thickness of the image-presence representing lines LN21 to LN24. As a further alternative, the presence and number of the images may be represented by a combination thereof.

While the embodiments of the invention have been described using an image processing unit for image data as an example, it is to be understood that the invention is not limited to those. The invention can be applied to various data processing units that process data including date attributes.

In the image search operation according to the foregoing embodiments, a program for executing the image search operation can be stored in a recording medium such as a flexible disk, a compact-disc read-only memory (CD-ROM), a ROM, or a memory card, and can be distributed in the form of a recording medium. In this case, the foregoing embodiments can be achieved such that the image processing unit 10 reads and executes the program stored in the recording medium.

The image processing unit 10 sometimes has other programs including an operating program and other application programs. In this case, to use the programs of the image processing unit 10, a program including an instruction to call a program for achieving a process equal to those of the foregoing embodiments may be stored in a recording medium.

The programs may be distributed not via a recording medium but in the form of carrier waves via a network. The programs transmitted via carrier waves over a network are taken into the image processing unit 10 to allow the foregoing embodiments to be achieved according to the programs.

The programs are sometimes coded or compressed when recorded in a recording medium or transmitted as carrier waves over a network. In this case, the image processing unit 10 that has read the programs from the recording medium or via the carrier waves needs to decode or decompress the programs for execution.

While the foregoing embodiments have been described for the case in which the image search operation is achieved according to software, the image search operation may be achieved either with hardware such as an application-specific IC (ASIC) or by cooperation of software and hardware.

What is claimed is:

1. A data processing unit comprising:
a data storage section;
a data acquisition section that acquires the dates of multiple date items including date attributes;
a date representing section that represents the dates of data such that a lapse of months from January to December is expressed circumferentially and a lapse of two or more years is expressed radially;
a search-range representing section superposed on the date representing section and representing a sectored search range concentric with the date representing section so that the user can designate a search range, wherein a central angle of the sectored search range represents a range of date of search data and a radial thickness of the sectored search range represents a range of year of the search data; and
a search section that searches for data having a date in the range designated in the search-range representing section from a date stored in the data storage section; and
a control section that controls at least one of the range of year of the search data and the range of date of search data, wherein
when the control section is controlled, at least one of the sectored search-range representation of the search-range representing section and the date representation of the date representing section are also controlled correspondingly;

the sectored search range represented by the search-range representing section includes:
a first arc
a second arc smaller than the first arc; and
two parallel straight lines connecting the first arc and the second arc, wherein
a sector is concentric with the date representing section, the central angle of the sector corresponding to the range of date of the search data; and
when the range of the year of search data is controlled by the control section, at least one of the first arc and the second arc of the search-range representing section is also controlled so that a search range represented over the date representing section includes a year of the search data but does not include other years.

2. The data processing unit according to claim 1, further comprising
a day-of-week selecting section that selects at least one of a day-of-week and a holiday to which the search data belongs, wherein
when the at least one of a day-of-week and a holiday is designated at the day-of-week selecting section, the search section searches for data including the designated at least one of a day-of-week and a holiday as an attribute.

3. The data processing unit according to claim 1, wherein
the date representing section includes a search-center designating section for a user to designate a central date of search, wherein
when the user designates the central date of search with the search-center designating section, the search-range representing section represents the search range such that the central date of the search divides a lapse of time of the search range into two parts.

4. The data processing unit according to claim 1, further comprising
a data-distribution calculating section that calculates a distribution of a number of data per date on a basis of a date of data;
wherein the date representing section represents dates on the basis of the distribution calculated by the data-distribution calculating section.

5. The data processing unit according to claim 3, wherein
the data is picture data; and
the date is the date on which the picture is taken.

6. The data processing unit according to claim 5, further comprising an image display section that displays images in the picture data found by the search section at random, with a transparency increased as the date separates from the central date designated by the search-center designating section.

7. The data processing unit according to claim 5, further comprising an image display section that displays the images in the picture data found by the search section in order of increasing lapse of time from the central date designated by the search-center designating section.

8. The data processing unit according to claim 5, further comprising an image display section that displays the images in the picture data found by the search section at random, wherein a size of the images decreased as the date separates from the central date designated by the search-center designating section.

9. The data processing unit according to claim 6, wherein the image display section displays the images in the picture data found by the search section, with the images thinned out, and in the form of a slide show.

10. The data processing unit according to claim 1, wherein the date representing section has a plurality of concentric circumferential rings, each of which represents one year.

11. The data processing unit according to claim 1, wherein the date representing section represents a lapse of time continuously and spirally, one round of a spiral representing a lapse of one year.

12. The data processing unit according to claim 1, wherein:
data stored in the data storage section is image data;
the data acquisition section acquires a date on which the image data stored in the data storage section is taken and wherein:
the data processing unit further comprising:
an image-distribution calculating section that calculates a distribution of a number of images per date image taken on a basis the date acquired by the data acquisition section; and
an image-distribution representing section that represents the distribution of the number of images calculated by the image-distribution calculating section in associated with a date represented by the date representing section, wherein changes in the number of images in the distribution of the number of images are represented by changes in hue or light and shade of a specific color.

13. The data processing unit according to claim 12, wherein the search section searches for image data having a date in the range designated by the search-range representing section from the image data stored in the data storage section.

14. A method for data search of a data processing unit including a data storage section that stores multiple data items including date attributes and a display screen, the method comprising:
displaying a date representing section on the display screen, the date representing section representing the date of data such that the lapse of months from January to December is expressed circumferentially and the lapse of two or more years is expressed radially;
representing on a search-range representing section a sectored search range superposed on the date representing section so that the user can designate a search range, the sectored search range being concentric with the date representing section on the display screen, wherein the central angle of the sectored search range represents the range of date of search data and the radial thickness of the sectored search range represents a range of year of the search data; and
searching for data having the date in the range designated in the search-range representing section from the date stored in the data storage section;
controlling at least one of the range of year of the search data and the range of date of search data, wherein
at least one of the sectored search-range representation of the search-range representing section and the date representation of the date representing section are also controlled correspondingly;
the sectored search range represented by the search-range representing section includes:
a first arc;
a second arc smaller than the first arc; and
two parallel straight lines connecting the first arc and the second arc, wherein
a sector is concentric with the date representing section, the central angle of the sector corresponding to the range of date of the search data; and
when the range of the year of search data is controlled, at least one of the first arc and the second arc is controlled so that a search range represented over the date representing section includes a year of the search data but does not include other years.

15. A recording medium that stores a program for searching for data with a data processing unit including a data storage section that stores multiple date items including date attributes and a display screen, the program comprising program code for:
displaying a date representing section on the display screen, the date representing section representing the date of data in such a manner that the lapse of months from January to December is expressed circumferentially and the lapse of two or more years is expressed radially;
representing a sectored search range superposed on the date representing section so that the user can designate a search range, the sectored search range being concentric with the date representing section on the display screen, wherein the central angle of the sectored search range represents the range of date of search data and the radial thickness of the sectored search range represents the range of year of the search data; and
searching for data having the date in the range designated in the search-range representing section from the date stored in the data storage section;
controlling at least one of the range of year of the search data and the range of date of search data, wherein
at least one of the sectored search-range representation of the search-range representing section and the date representation of the date representing section are also controlled correspondingly;
the sectored search range represented by the search-range representing section includes:
a first arc;
a second arc smaller than the first arc; and
two parallel straight lines connecting the first arc and the second arc, wherein
a sector is concentric with the date representing section, the central angle of the sector corresponding to the range of date of the search data: and when the range of the year of search data is controlled, at least one of the first arc and the second arc is controlled so that a search range represented over the date representing section includes a year of the search data but does not include other years.

* * * * *